(12) United States Patent
Lee

(10) Patent No.: US 10,873,168 B2
(45) Date of Patent: Dec. 22, 2020

(54) TERMINAL STRUCTURE AND ELECTRIC COMPRESSOR INCLUDING THE SAME

(71) Applicant: LG ELECTRONICS INC., Seoul (KR)

(72) Inventor: Kyuho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/683,364

(22) Filed: Nov. 14, 2019

(65) Prior Publication Data

US 2020/0313373 A1    Oct. 1, 2020

(30) Foreign Application Priority Data

Mar. 25, 2019   (KR) .................. 10-2019-0033812

(51) Int. Cl.
*H01R 13/627* (2006.01)
*H01R 25/16* (2006.01)
*H01R 13/11* (2006.01)
*H01R 13/04* (2006.01)

(52) U.S. Cl.
CPC ........... *H01R 25/161* (2013.01); *H01R 13/04* (2013.01); *H01R 13/113* (2013.01)

(58) Field of Classification Search
CPC .......... H01R 13/62938; H01R 13/6275; H01R 23/7068; H01R 13/62933; H01R 13/641
USPC .............. 439/157, 357, 924.1, 372, 489
See application file for complete search history.

(56) References Cited

U.S. PATENT DOCUMENTS

| 5,580,264 A * | 12/1996 | Aoyama | H01R 13/5208 439/275 |
| 5,890,927 A * | 4/1999 | Yashima | H01R 13/5208 439/587 |
| 6,814,617 B2 * | 11/2004 | Oota | H01R 13/5205 174/365 |

(Continued)

FOREIGN PATENT DOCUMENTS

| JP | 2018-517092 A | 6/2018 |
| KR | 10-1115690 | 3/2012 |

(Continued)

OTHER PUBLICATIONS

Notice of Allowance for corresponding Korean Application No. 10-2019-0033812, dated Nov. 12, 2019 (5 pages).

*Primary Examiner* — Phuong Chi Thi Nguyen
(74) *Attorney, Agent, or Firm* — Finnegan, Henderson, Farabow, Garrett & Dunner LLP

(57) ABSTRACT

An electric compressor includes a terminal structure. The terminal structure may include a busbar assembly electrically connected to an inverter and a terminal electrically connected to a motor part. The terminal structure may include at least one electrical connection member. Contact plates may be electrically connected to each end of the electric connection member. The busbar assembly for electrically connecting the terminal and the inverter device may include a plurality of busbars having a large surface area. When high current is applied to the electric compressor, as the surface area of respective members brought into contact with each other for electric connection increases, contact heat resistance decreases, which makes it possible to apply a high current without increasing the size of the terminal.

20 Claims, 12 Drawing Sheets

(56) References Cited

U.S. PATENT DOCUMENTS

| | | | |
|---|---|---|---|
| 7,682,205 B2 * | 3/2010 | Hall | H01R 13/4361 |
| | | | 439/752 |
| 9,033,734 B2 * | 5/2015 | Tanaka | H01R 13/6592 |
| | | | 439/587 |
| 9,787,014 B2 * | 10/2017 | Nagasawa | H01R 13/4362 |

FOREIGN PATENT DOCUMENTS

| | | |
|---|---|---|
| KR | 10-2017-0035743 A | 3/2017 |
| KR | 10-1751061 | 6/2017 |

* cited by examiner (a)

(b)

TERMINAL STRUCTURE AND ELECTRIC COMPRESSOR INCLUDING THE SAME

CROSS-REFERENCE TO RELATED APPLICATION

Pursuant to 35 U.S.C. § 119(a), this application claims the benefit of earlier filing date and right of priority to Korean Application No. 10-2019-0033812, filed on Mar. 25, 2019, the contents of which are incorporated by reference herein in their entirety.

BACKGROUND OF THE INVENTION

1. Field of the Invention

The present invention relates to a terminal structure and an electric compressor including the same, and in particular, to a terminal structure capable of stably supplying power to an electric compressor, which operates with low voltage high current power, and the electric compressor including the same.

2. Background of the Invention

A compressor which serves to compress a refrigerant in an air conditioning system for a vehicle has been developed in various forms. Recently, with an electric tendency of vehicle components, an electric compressor driven using a motor with electricity has been actively developed.

The electric compressor mostly adopts a scroll compression technique suitable for a high compression ratio operation. The scroll type electric compressor (hereinafter, referred to as "electric compressor") is composed of an electric part, a compression part, a rotating shaft for connecting the electric part and the compression part, and an inverter part for controlling a driving part.

More specifically, the electric part is provided as a rotary motor, etc. and arranged in a hermetic casing. The compression part is positioned at one side of the electric part and composed of a fixed scroll and an orbiting scroll. The rotating shaft is configured to transfer a rotational force of the electric part to the compression part.

Nowadays, a "low voltage high current" type electric compressor has been developed, in which a voltage of input power is low and a current thereof is high. As such, taking into account that the electric compressor is provided in the vehicle, it can be applied to a mild hybrid vehicle as well as a pure electric vehicle.

However, when a high current is applied, a wiring, etc. acts as a resistance, which leads to a large amount of heat generation. This may cause a damage in an electric device or the like for application of power, as a result of which a size of a terminal should increase.

More specifically, in order to prevent a damage caused by heat generation, the surface area of the terminal to be supplied with a high current should increase. When the size of the terminal is increased so that the surface area of the terminal can be increased, the size of the whole electric compressor equipped with the terminal may increase.

Taking into account that the electric compressor is provided in the vehicle, it is not preferable to increase the size of the terminal without limitation. The small size and light weight of the electric compressor are the essential conditions for providing the electric compressor in the vehicle for movement.

Korea Patent 10-1115690 discloses a terminal assembly provided in a hermetic compressor. More specifically, the terminal assembly includes a cap for covering a PTC part mounted in a mounting part of a terminal board, the cap preventing heat generated by the PTC part from being transferred to the outside.

The terminal assembly can block heat generated as power is applied, but cannot solve a problem related to the size increase of the terminal when a high current is applied.

Korea Patent 10-1751061 discloses a terminal device for an electric compressor. More specifically, a fastening groove is formed in an inner circumference of a seating portion of a compressor casing, and a separate snap ring is inserted into the fastening groove when a hermetic terminal is disposed in the seating portion, which makes it possible to maintain the coupling state.

The terminal device can maintain the coupling state of the hermetic terminal and seal the hermetic terminal, but cannot solve a problem related to the size increase of the terminal when a high current is applied.

SUMMARY OF THE INVENTION

Therefore, an object of the present invention is to provide a terminal structure and an electric compressor including the same which can solve the aforementioned problems.

One object of the present invention is to provide a terminal structure, which can ensure stable electric connection even when a high current is applied, and an electric compressor including the same.

Another object of the present invention is to provide a terminal structure, which can minimize a damage caused by heat when a high current is applied, and an electric compressor including the same.

A further object of the present invention is to provide a terminal structure, which can apply a high current without increasing a size of a terminal supplied with power, and an electric compressor including the same.

A still further object of the present invention is to provide a terminal structure, which can apply a high current without increasing a size of a an electric compressor, and the electric compressor including the same.

A still further object of the present invention is to provide a terminal structure, which can define separate power paths to correspond to three phase power, and an electric compressor including the same.

A still further object of the present invention is to provide a terminal structure, which includes a few terminals to correspond to three phase power and which facilitates connection of an inverter device, and an electric compressor including the same.

A still further object of the present invention is to provide a terminal structure, which includes a few terminals to correspond to three phase power while simplifying the structure, and an electric compressor including the same.

A still further object of the present invention is to provide a terminal structure, which can be easily connected to an inverter device and an electric device so that they can be electrically connected to each other, and an electric compressor including the same.

A still further object of the present invention is to provide a terminal structure, which can be easily connected to an inverter device and an electric device even when the directions of terminal portions of the inverter device and the electric device are changed, and an electric compressor including the same.

To achieve these and other advantages and in accordance with the purpose of the present invention, as embodied and broadly described herein, there is provided a terminal structure including: a plate-shaped support member; an electric connection member extending in a longitudinal direction, coupled to the support member in a piercing manner, and electrically connected to a motor part and an inverter device; and contact plates positioned at one end of the electric connection member and the other end opposite to the one end to increase the surface area of the electric connection member and electrically connected to the electric connection member, wherein a plurality of said contact plates are provided at one end and the other end of the electric connection member, respectively, and the plurality of contact plates positioned at one end of the electric connection member and the plurality of contact plates positioned at the other end of the electric connection member are disposed at a certain angle to one another.

In addition, the side of the electric connection member of the terminal structure may be rounded and the contact plate may be configured to contact the side of the electric connection member.

Moreover, the side of the electric connection member of the terminal structure may be flat and the contact plate may be configured to contact the side of the electric connection member.

Further, the contact plates of the terminal structure may be disposed at an angle of 180° to face each other.

Furthermore, a plurality of said electric connection members of the terminal structure may be provided and the plurality of contact plates may be positioned at one end and the other end of the plurality of electric connection members, respectively.

Still furthermore, the terminal structure may include a busbar assembly coupled to the contact plate of the terminal structure, wherein the busbar assembly may include: a busbar electrically connected to the contact plate; and a busbar housing for receiving the busbar.

Still furthermore, the busbar assembly of the terminal structure may include: an electric connection member access portion projecting from one end of the busbar toward the contact plate; and a coupling member for electrically connecting the electric connection member access portion and the contact plate.

Still furthermore, the coupling member of the terminal structure may include: a busbar coupling portion electrically connected to the electric connection member access portion; a neck portion extending from the busbar coupling portion toward the contact plate at a certain angle to the busbar coupling portion; and a contact plate support portion extending from the neck portion toward the contact plate at a certain angle to the neck portion and brought into contact with one surface of the contact plate.

Still furthermore, a plurality of said coupling members of the terminal structure may be coupled to the plurality of contact plates, respectively, and the coupling member may include: a contact plate securing portion extending from the contact plate support portion toward the contact plate at the certain angle; and a contact plate space portion defined between the contact plate support portion and the contact plate securing portion to receive the contact plate.

To achieve these and other advantages and in accordance with the purpose of the present invention, as embodied and broadly described herein, there is provided an electric compressor, including: a motor part; an inverter device configured to apply a control signal to the motor part; and a terminal structure positioned between the motor part and the inverter device to electrically connect the motor part and the inverter device, wherein the terminal structure includes: a plate-shaped support member; an electric connection member extending in a longitudinal direction, coupled to the support member in a piercing manner, and having one end electrically connected to the motor part and the other end opposite to the one end that is electrically connected to the inverter device; and contact plates positioned at one end of the electric connection member and the other end opposite to the one end to increase the surface area of the electric connection member and electrically connected to the electric connection member, wherein a plurality of said contact plates are provided at one end and the other end of the electric connection member, respectively, and the plurality of contact plates positioned at one end of the electric connection member and the plurality of contact plates positioned at the other end of the electric connection member are disposed at a certain angle to one another.

In addition, the plurality of contact plates may be positioned at the side of one end of the electric connection member of the electric compressor and at the side of the other end of the electric connection member, respectively.

Moreover, the terminal structure of the electric compressor may include a busbar assembly coupled to the contact plate positioned at the other end of the electric connection member, wherein the busbar assembly may include: a busbar extending in a longitudinal direction and electrically connected to the contact plate; and a busbar housing for receiving the busbar.

Further, the other end of the electric connection member of the electric compressor may extend in a direction toward the inverter device and the busbar assembly may extend at a certain angle to the other end of the electric connection member.

Furthermore, the busbar assembly of the electric compressor may include: an electric connection member access portion positioned at one end of the busbar to project toward the contact plate; and an inverter access portion positioned at the other end opposite to one end of the busbar to project toward the inverter device.

Still furthermore, the busbar assembly of the electric compressor may include a coupling member for electrically connecting the electric connection member access portion and the contact plate, wherein the coupling member may include: a busbar coupling portion electrically connected to the electric connection member access portion; a neck portion extending from the busbar coupling portion toward the contact plate at a certain angle to the busbar coupling portion; and a contact plate support portion extending from the neck portion toward the contact plate at a certain angle to the neck portion and brought into contact with one surface of the contact plate.

Still furthermore, the inverter device of the electric compressor may include a terminal coupling module electrically connected to the inverter access portion of the busbar assembly and the motor part may include a connector module electrically connected to one end of the electric connection member.

According to the present invention, the following effects can be obtained.

First, the plurality of contact plates are provided at the ends of the electric connection member. The plurality of contact plates are formed of conductors and brought into contact with the ends of the electric connection member formed of conductors as well. Thus, the entire surface area of the terminal to be supplied with power can increase.

As a result, even when a high current is applied, stable electric connection is made possible.

In addition, as the plurality of contact plates are provided at the ends of the electric connection member, the surface area that can emit the generated heat can increase.

Accordingly, heat generated when a high current is applied can be efficiently emitted, which makes it possible to minimize a damage in the terminal structure caused by heat.

Moreover, the plurality of contact plates provided to contact the electric connection member are electrically connected to the electric connection member, such that the entire surface area of the terminal portion increases.

It is thus possible to apply a high current without increasing the size of the electric connection member and the terminal structure. Further, it is also possible to apply a high current without increasing the size of the electric compressor.

Furthermore, the terminal structure may include the plurality of electric connection members. Currents having different phases can be applied to the plurality of electric connection members, respectively.

Therefore, not only when a single phase current is applied but also when a three phase current is applied, separate power paths can be defined, such that the inverter device and the electric device can be stably electrically connected to each other.

In addition, the electric connection member of the terminal structure that faces the inverter device is electrically connected to the busbar assembly. The busbar assembly includes the plurality of busbars for defining separate electric connection paths, respectively, so that currents having different phases can flow therethrough.

It is thus possible to transfer or supply three phase power with a simple structure, without complicating the wiring.

Furthermore, the busbar assembly includes the plurality of busbars electrically connected to the plurality of electric connection members, respectively. The plurality of busbars are received in the busbar housing not to be exposed to the outside. Still furthermore, the inverter device, the terminal structure and the motor part are electrically connected to one another by insertion or connector fastening.

Accordingly, a separate wiring is not required to electrically connect the inverter device, the terminal structure and the motor part, which makes it possible to simplify the structure.

In addition, the terminal assembly and the inverter device are electrically connected to each other by the busbar assembly. Further, the electric device is provided with the connector module coupled to the contact plate of the terminal assembly.

Therefore, the inverter device and the terminal assembly and the electric device can be easily connected to one another, such that connection of the inverter device and the terminal assembly and the electric device can be carried out in a simple manner.

In addition, the angle of the plurality of contact plates coupled to the electric connection member can vary.

Thus, even when the inverter device and the electric device are arranged in changed directions, it is possible to electrically connect the inverter device and the electric device simply by changing the angle of the plurality of contact plates.

DETAILED DESCRIPTION OF THE INVENTION

Figure 1:
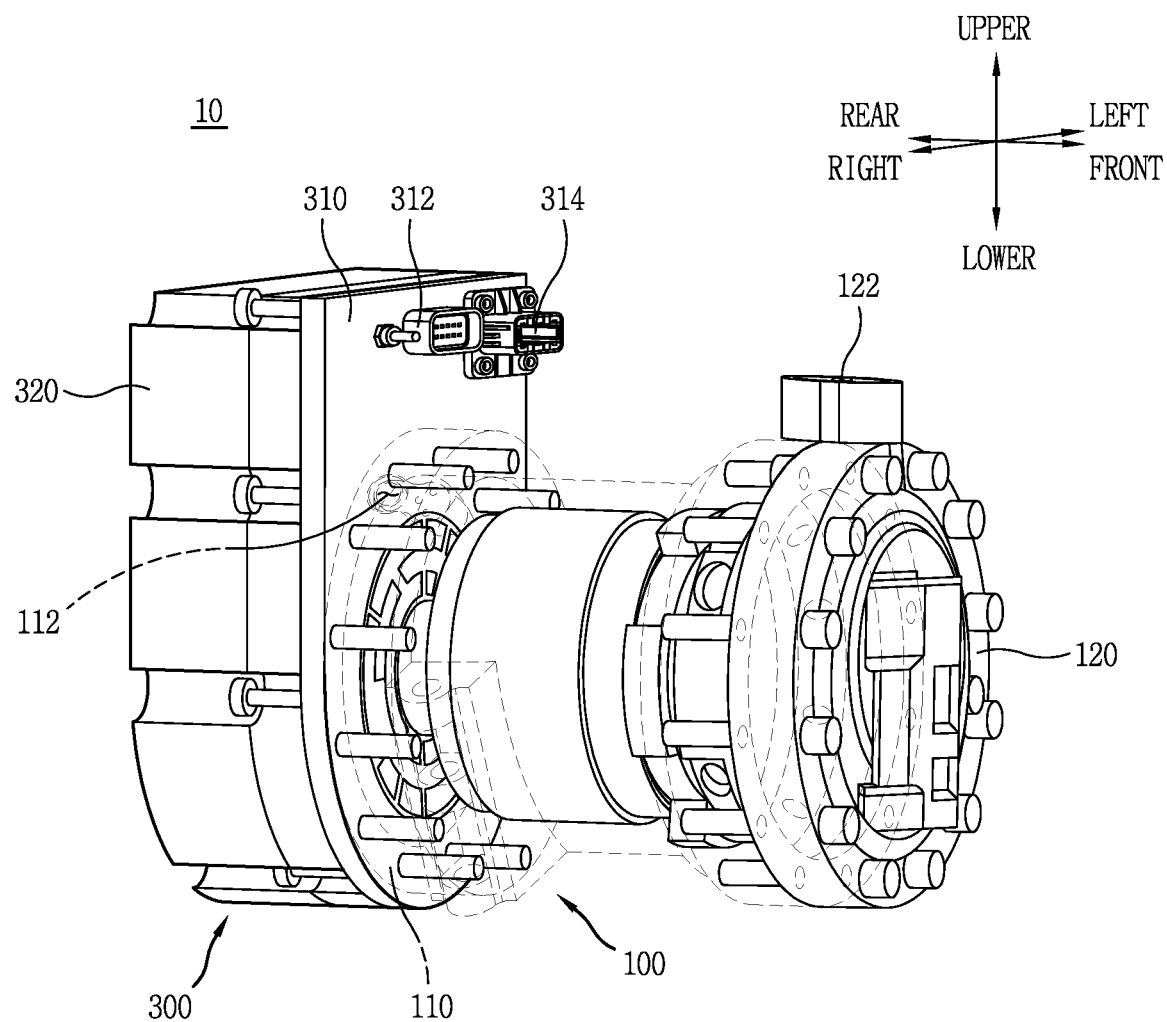
FIG. 1 is a perspective view showing an electric compressor according to an embodiment of the present invention.

Hereinafter, a terminal structure and an electric compressor including the same according to an embodiment of the present invention will be described in detail with reference to the accompanying drawings.

In the present specification, in order to further clarify the characteristics of the present invention, some of the elements may not be described.

1. Definition of the Terms

As used herein, the terms "front", "rear", "upper", "lower", "right" and "left" will be understood with reference to the coordinate system shown in FIGS. 1, 3, 5 and 10.

It will be understood that when an element is referred to as being "connected" or "coupled" to another element, it can be directly connected or coupled to the other element or intervening elements may be present therebetween.

In contrast, when an element is referred to as being "directly connected" or "directly coupled" to another element, there are no intervening elements present.

As used herein, the singular forms "a", "an" and "the" are intended to include the plural forms as well, unless the context clearly indicates otherwise.

As used herein, the term "refrigerant" means any medium that takes heat from a cool object and transfers it to a hot object. In an embodiment, the refrigerant may be $CO_2$, R134a, or R1234yf.

As used herein, the term "semiconductor device" means an electric circuit device using a semiconductor. In an embodiment, the semiconductor device may be a switching device.

That is, in an embodiment, the semiconductor device may indicate a component or device provided as a switching device to open and close a circuit without using a contact. In the above embodiment, the switching device may be provided as an SIC (Silicon Carbide), GaN (Gallium Nitride), IGBT (Insulated Gate Bipolar Transistor), MOSFET (Metal-Oxide Semiconductor Field-Effect Transistor), etc.

As used herein, the term "high current" means a current having a high value as compared with a current applied to a typical electric compressor. In an embodiment, the high current may be defined as a current greater than about 100 A.

2. Description of Configuration of Electric Compressor 10 According to an Embodiment of Present Invention Referring to FIGS. 1 and 2, an electric compressor 10 according to an embodiment of the present invention includes a housing part 100, a motor part 200, an inverter part 300, and a compression part 400. In addition, the electric compressor 10 according to the embodiment of the present invention further includes a terminal structure 1000 (see FIG. 3) for use in electric connection between the motor part 200 and the inverter part 300.

Hereinafter, the configuration of the electric compressor 10 according to the embodiment of the present invention will be described with reference to the attached drawings, with the terminal structure 1000 described in a separate paragraph.

(1) Description of Housing Part 100

The housing part 100 defines the external appearance of the electric compressor 10. That is, the housing part 100 is part of the electric compressor 10 exposed to the outside. Thus, the housing part 100 is preferably made of a durable material.

In the embodiment shown, the housing part 100 includes a main housing 110 and a rear housing 120. In addition, the inverter part 300 discussed later includes an inverter housing 310 and an inverter cover 320 which receive the inverter part 300, such that they may also be included in the housing part 100.

The main housing 110 is formed in an elongate cylindrical shape extending in a longitudinal direction, i.e., in a front and rear direction.

In addition, the front end and the rear end of the main housing 110 have a diameter greater than that of a portion interposed therebetween, which allows the main housing 110 to be fastened to the rear housing 120 and the inverter part 300.

The shape of the main housing 110 can vary. However, taking into consideration that a refrigerant is compressed in the main housing 110, the main housing 110 preferably has a circular section with the highest pressure resistance.

The main housing 110 receives the motor part 200 and the compression part 400. The motor part 200 is rotated by a control signal applied from an inverter device 330 discussed later. Such rotation of the motor part 200 is transferred to the compression part 400, which causes the refrigerant to be compressed.

To this end, a rotating shaft (not shown) for rotatably connecting the motor part 200 and the compression part 400 may be provided in the main housing 110.

The refrigerant to be compressed may be introduced into the main housing 110. To this end, an inlet 112 may be formed in the main housing 110 to fluidly connect the inside and outside of the main housing 110.

In the embodiment shown, the inlet 112 is provided as a circular through hole on the circumference of the rear side of the main housing 110 that is adjacent to the inverter part 300.

The inlet 112 may have any shape and position so far as it allows the inside and outside of the main housing 110 to communicate with each other.

A motor chamber 114 is defined in the main housing 110. The motor chamber 114 is a space surrounded by the inner surface of the main housing 110. The motor chamber 114 receives the motor part 200.

More specifically, a stator 210 of the motor part 200 is fixedly coupled to the inner surface of the main housing 110 that partitions the motor chamber 114.

The main housing 110 may further include a terminal structure securing portion 116 (see FIG. 3) for securing the terminal structure 1000 discussed later. The terminal structure 1000 may be secured to the terminal structure securing portion 116 by screwing, etc.

The main housing 110 communicates with the rear housing 120. That is, the refrigerant introduced through the inlet 112 of the main housing 110 is compressed in the compression part 400, and then discharged to the outside of the electric compressor 10 through an outlet 122 of the rear housing 120.

The rear housing 120 is positioned at one side of the main housing 110, i.e., at the front side in the embodiment shown.

The rear housing 120 defines part of the external appearance of the electric compressor 10. The rear housing 120 is provided as a type of cap having a circular section. The rear housing 120 may have any shape corresponding to the shape of the main housing 110.

The rear housing 120 communicates with the main housing 110. The refrigerant compressed in the main housing 110 may pass through the rear housing 120 and escape to the outside of the electric compressor 10.

The outlet 122 is formed at one side of the rear housing 120, i.e., at the front side in the embodiment shown.

The outlet 122 is a path through which the compressed refrigerant is discharged to the outside of the electric compressor 10. The outlet 122 fluidly connects the inside and outside of the rear housing 120.

In the embodiment shown, the outlet 122 is formed in the upper portion of the front side of the rear housing 120 in a vertical direction. The outlet 122 may have any shape and position so far as it allows the inside and outside of the rear housing 120 to communicate with each other.

(2) Description of Motor Part 200

The motor part 200 is received in the motor chamber 114 of the main housing 110 to provide power for the compression part 400 to compress the refrigerant. The motor part 200 may be operated and controlled by the control signal and power applied from the inverter part 300.

To this end, the motor part 200 and the inverter part 300 are electrically connected by the terminal structure 1000 discussed later. It will be described below in detail.

The motor part 200 is connected to the compression part 400 by the rotating shaft (not shown). The rotating shaft (not shown) may be rotatably connected to the motor part 200 and the compression part 400, respectively.

A rotational force generated in the motor part 200 by the rotating shaft (not shown) may be transferred to an orbiting scroll 410 of the compression part 400.

The motor part 200 includes a stator 210 and a rotor 220.

The stator 210 generates an electromagnetic field by power applied from the inverter part 300. The rotor 220 is rotated by the electromagnetic field generated by the stator 210, which generates a rotational force for the orbiting scroll 410 of the compression part 400 to rotate.

The stator 210 includes a plurality of coils (not shown). The plurality of coils (not shown) generate an electromagnetic field as power is applied. The plurality of coils (not shown) are disposed in such a manner that the rotor 220 can be rotated in a certain direction by the electromagnetic field.

The stator 210 is disposed in contact with the inner surface of the motor chamber 114. The stator 210 may be secured to the inner surface of the motor chamber 114. Accordingly, the stator 210 itself is not rotated by the control signal and power applied from the inverter part 300.

The stator 210 has a hollow portion. The rotor 220 is positioned in the hollow portion. The rotor 220 is spaced apart from the stator 210 by a certain distance. Thus, when the stator 210 is secured, only the rotor 220 can be rotated by the electromagnetic field.

The rotor 220 generates a rotational force for the orbiting scroll 410 of the compression part 400 to rotate. The rotor 220 is rotated by the electromagnetic field generated by the plurality of coils (not shown) of the stator 210 by power applied from the inverter part 300.

To this end, the rotor 220 includes a plurality of magnets (not shown). When the electromagnetic field is generated by the stator 210, the plurality of magnets (not shown) are supplied with an electromagnetic force, such that the rotor 220 rotates relative to the stator 210.

The rotor 220 may be rotatably connected to the inverter part 300. In addition, the rotor 220 may be rotatably connected to the orbiting scroll 410 of the compression part 400 by the rotating shaft (not shown).

Here, the inverter part 300 does not rotate independently of the rotation of the rotor 220, the orbiting scroll 410 being preferably connected to integrally rotate with the rotor 220.

The rotor 220 is positioned in the hollow portion defined in the stator 210. In addition, the rotor 220 is spaced apart from the stator 210 by a certain distance. That is, the outer surface of the rotor 220 and the inner surface of the stator 210 are not brought into contact with each other.

(3) Description of Inverter Part 300

The inverter part 300 receives the inverter device 330 for applying the control signal and power to the motor part 200.

The inverter part 300 is positioned at one side of the main housing 110, i.e., at the rear side of the main housing 110 opposite to the rear housing 120 in the embodiment shown. The inverter part 300 may have any position so far as it can apply the control signal and power to the motor part 200.

In the embodiment not shown, the inverter part 300 may include a cooling hole (not shown) communicating with the main housing 110. In this case, the refrigerant introduced into the main housing 110 may be introduced into the inverter part 300.

In the above embodiment, the inverter device 330 received in the inverter part 300 can be cooled by the refrigerant, which leads to an improved cooling effect for the inverter device 330.

The control signal and power can be applied to the inverter part 300. In order to prevent unnecessary electric connection to the outside and noise of the control signal, the inverter part 300 may be made of an insulating material. As an example, the inverter part 300 may be made of a synthetic resin, etc.

The inverter part 300 includes the inverter housing 310, the inverter cover 320, and the inverter device 330.

The inverter housing 310 is coupled to the inverter cover 320 to define the outside of the inverter part 300. The inverter housing 310 is coupled to the rear side of the main housing 110.

A rotating shaft support portion (not shown) may be provided on one surface of the inverter housing 310 that is adjacent to the main housing 110, i.e., on the front surface in the embodiment shown. The rotating shaft (not shown) to which the motor part 200 is rotatably connected is supported on the rotating shaft support portion (not shown).

A communication connector 312 and a power connector 314 are provided at the inverter housing 310. The control signal for controlling the motor part 200 is applied to the communication connector 312. In addition, power for driving the motor part 200 is applied to the power connector 314.

In the embodiment shown, the communication connector 312 and the power connector 314 are positioned at the upper side of one surface of the inverter housing 310 that is adjacent to the main housing 110. The communication connector 312 and the power connector 314 may have any position so far as they can receive the control signal and power from the outside.

As an example, the communication connector 312 and the power connector 314 may be positioned on the rear surface of the inverter cover 320.

The inverter cover 320 is provided at one side of the inverter housing 310 opposite to the main housing 110, i.e., at the rear side of the inverter housing 310 in the embodiment shown.

The inverter cover 320 is coupled to the inverter housing 310. As such, a space is defined between the inverter cover 320 and the inverter housing 310 to receive the inverter device 330.

The inverter cover 320 and the inverter housing 310 may be coupled by a separate fastening means (not shown). The shape of the inverter cover 320 preferably corresponds to the shape of the inverter housing 310.

The inverter device 330 receives, from the outside, the control signal for controlling a rotation number, speed, etc. of the motor part 200 and power for driving the motor part 200. To this end, the inverter device 330 is electrically connected to the communication connector 312 and the power connector 314.

The control signal and power transferred to the inverter device 330 may be transferred to the motor part 200 by the terminal structure 1000 discussed later. It will be described below in detail.

The inverter device 330 is received in the space defined between the inverter housing 310 and the inverter cover 320. As such, the inverter device 330 can be physically isolated from the outside of the inverter part 300.

In the embodiment shown, the inverter device 330 is provided in the form of a plate-type printed circuit board (PCB). The inverter device 330 may have any shape so far as it can receive the control signal and power from the outside and transfer them to the motor part 200.

The inverter device 330 includes a semiconductor device 332 and a terminal coupling module 334.

The semiconductor device 332 substantially acts as the inverter part 300 described above. More specifically, the semiconductor device 332 converts and operates the control signal and power applied to the inverter part 300, and then transfers them to the motor part 200.

The semiconductor device 332 may be provided as a variety of electric and electric components (not shown) for receiving the control signal and power and controlling the motor part 200.

As an example, the semiconductor device 332 may be provided as an SIC, GaN, IGBT, MOSFET, etc., as described above.

In the terminal coupling module 334, the terminal structure 1000 discussed later is electrically connected to the inverter device 330 (see FIGS. 3 and 4).

As described below, the terminal structure 1000 includes a busbar assembly 1200 positioned adjacent to the inverter device 330. The busbar assembly 1200 includes a plurality of inverter access portions 1240 projecting therefrom, such that it can be electrically connected to the inverter device 330.

To this end, the terminal coupling module 334 may correspond to the inverter access portion 1240 in number, position and shape. That is, as the plurality of inverter access portions 1240 are provided in a projecting manner, the same number of terminal coupling modules 334 may be provided in the same position so that the inverter access portions 1240 can be inserted thereinto or coupled thereto in a piercing manner.

In an embodiment, the terminal coupling module 334 may be formed as a groove into which the inverter access portion 1240 can be inserted and coupled.

The control signal and power applied to the inverter device 330 are transferred to the motor part 200 via the terminal structure 1000 through the terminal coupling module 334.

(4) Description of Compression Part 400

The compression part 400 substantially acts as the electric compressor 10 for compressing the refrigerant introduced into the inlet 112. The electric compressor 10 according to the embodiment of the present invention is a scroll compressor using a scroll.

The compression part 400 includes an orbiting scroll 410 and a fixed scroll 420.

The orbiting scroll 410 is eccentrically coupled to the rotating shaft (not shown) coupled to the rotor 220 of the motor part 200. Thus, when the rotor 220 rotates, the orbiting scroll 410 orbits relative to the fixed scroll 420.

By the orbiting motion of the orbiting scroll 410, the orbiting scroll 410 and the fixed scroll 420 define a pair of compression chambers (not shown) composed of a suction chamber (not shown), an intermediate pressure chamber (not shown), and a discharge chamber (not shown).

A process of compressing a refrigerant using the orbiting scroll 410 and the fixed scroll 420 has been well-known, so a detailed description thereof will be omitted.

3. Description of Terminal Structure 1000 According to the Embodiment of the Present Invention The electric compressor 10 according to the embodiment of the present invention includes the terminal structure 1000 for electrically connecting the inverter device 330 and the motor part 200.

The terminal structure 1000 is positioned between the inverter device 330 and the motor part 200. In addition, the terminal structure 1000 is configured to allow seamless electric connection, even when a high current is applied to the electric compressor 10, and to prevent a damage caused by heat.

The terminal structure 1000 may be secured to the main housing 110. More specifically, the terminal structure 1000 may be fixedly coupled to the terminal structure securing portion 116.

Figure 3:
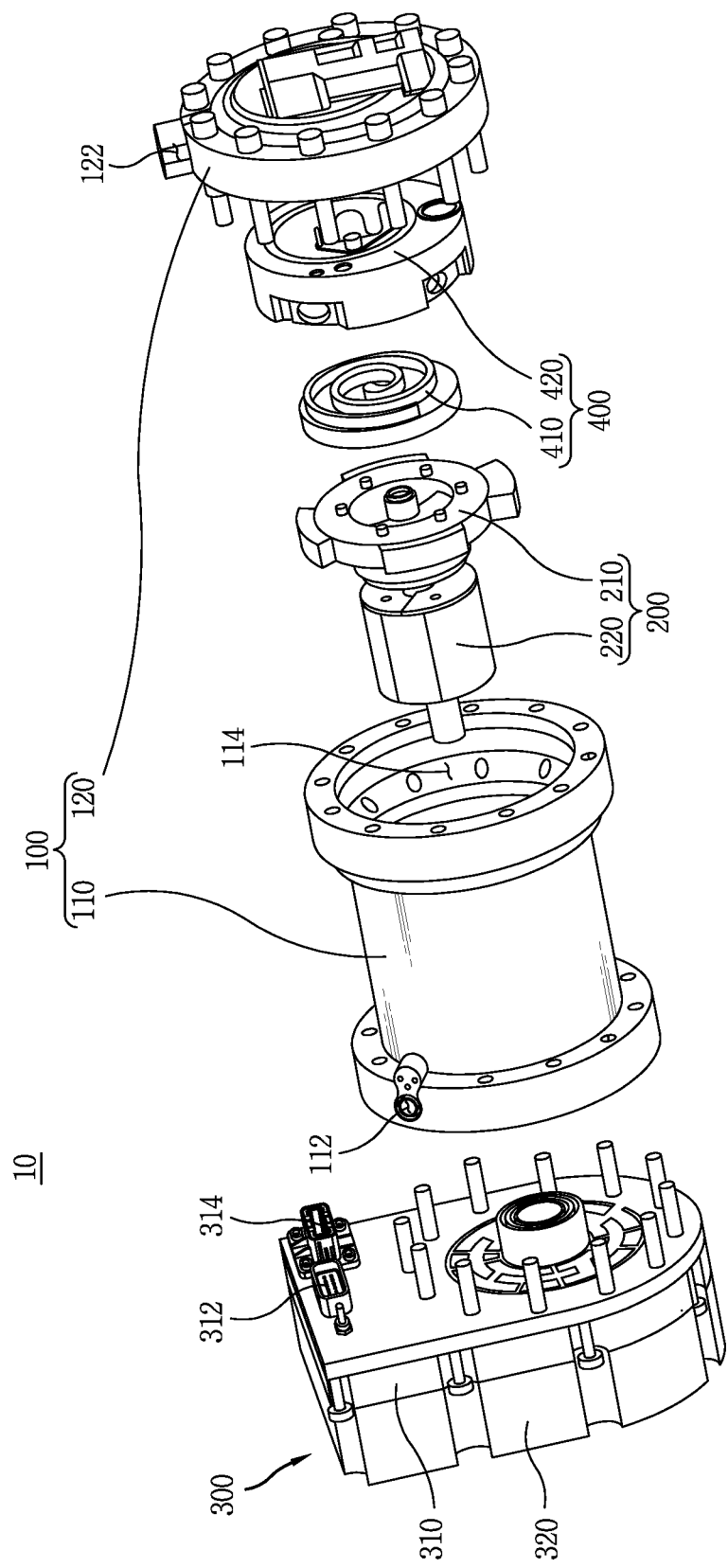
FIG. 3 is a cutaway perspective view showing a terminal structure provided in an electric compressor according to an embodiment of the present invention.
Figure 4:
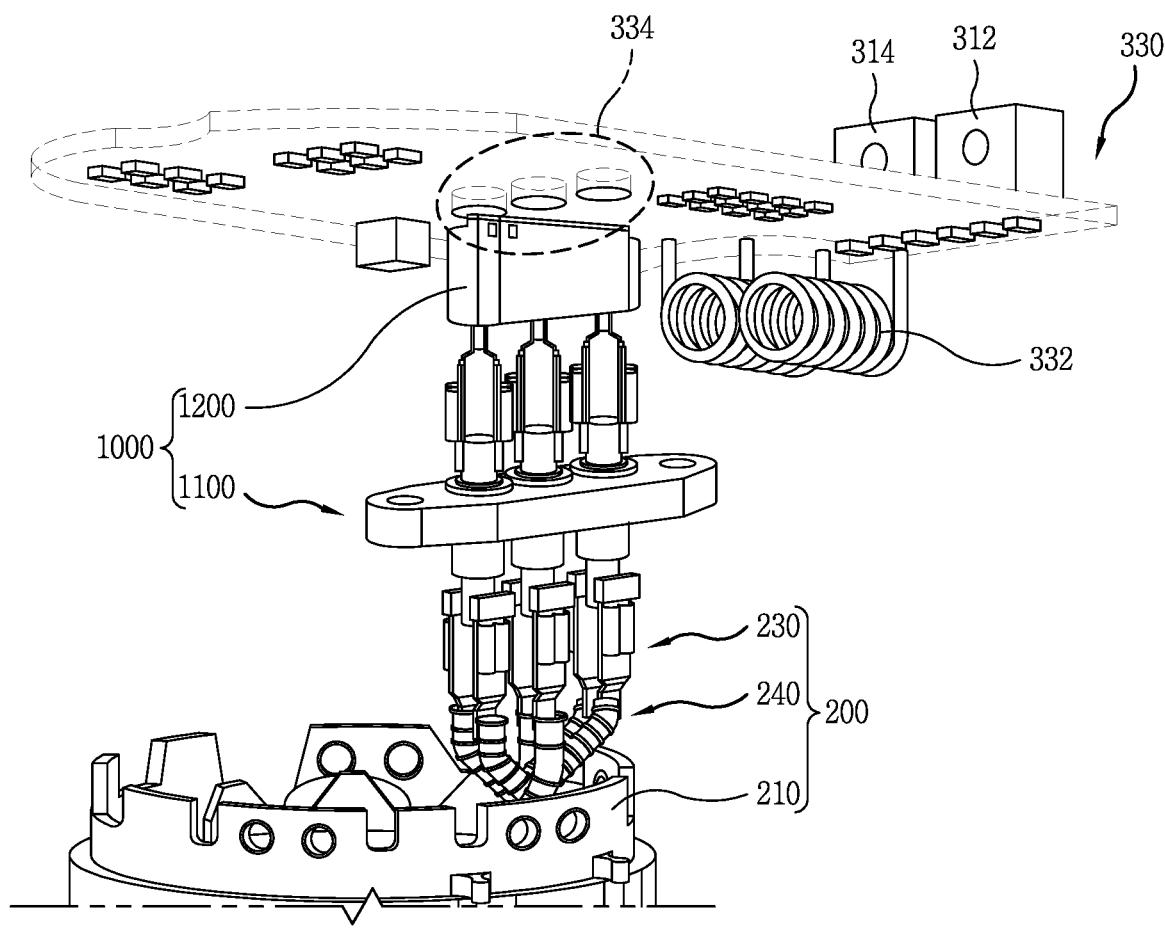
FIG. 4 is a perspective view showing the terminal structure provided in the electric compressor according to the embodiment of the present invention, when seen from a different angle.

Referring to FIGS. 3 and 4, the terminal structure 1000 includes a terminal 1100 and a busbar assembly 1200.

Figure 2:
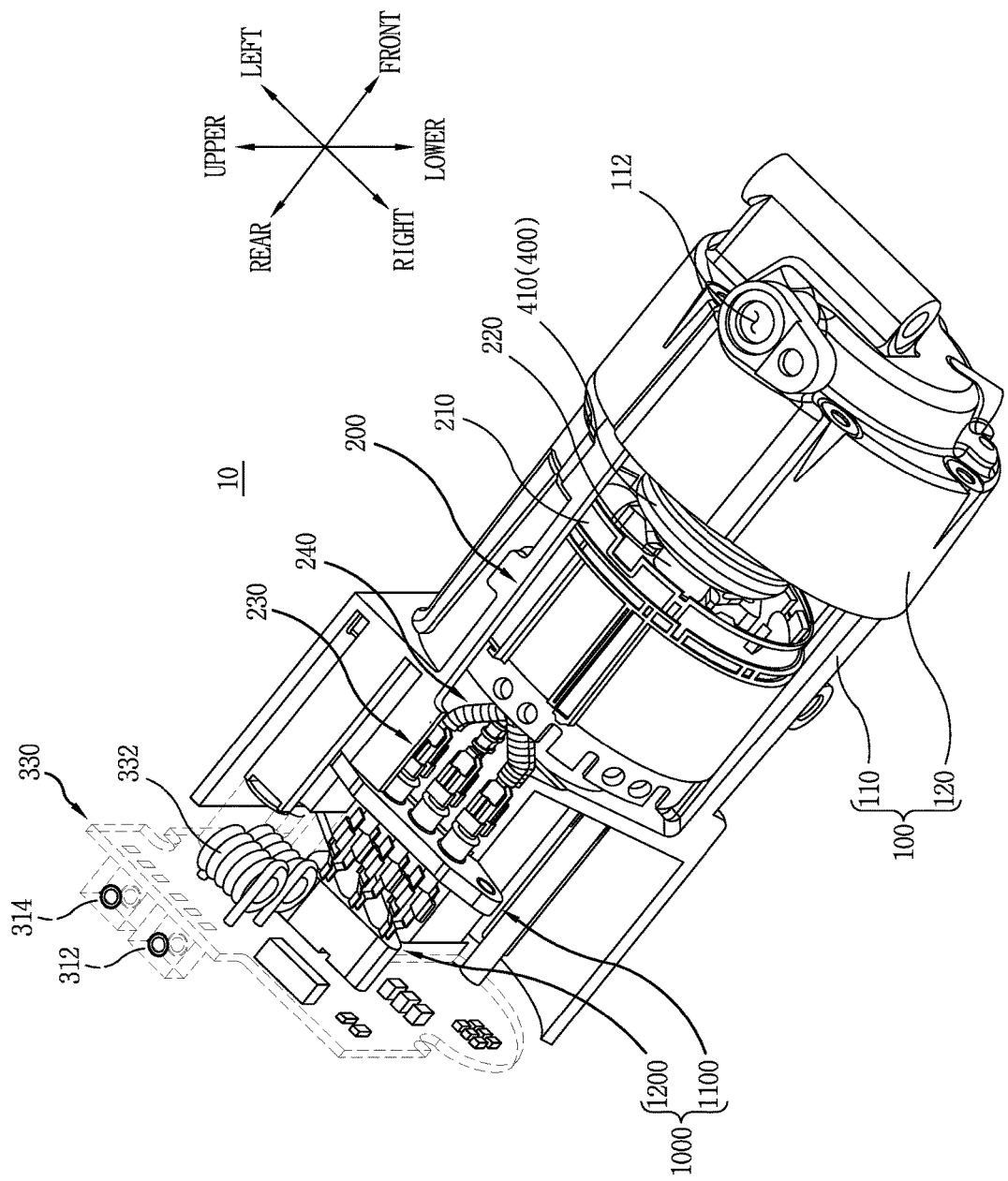
FIG. 2 is an exploded perspective view showing the electric compressor of FIG. 1.

Also in the embodiment shown in FIGS. 2 and 4, the housing part 100 and the inverter part 300 described above may be formed as a single piece.

That is, instead of providing the inverter housing 310 and the inverter cover 320 for receiving the inverter device 330, the inverter device 330 may be received in the main housing 110.

In this case, the inverter device 330 is positioned at one side of the motor part 200 opposite to the rear housing 120, i.e., at the rear side of the main housing 110 in the embodiment shown.

The terminal structure 1000 may be provided between the inverter device 330 and the motor part 200 to electrically connect the inverter device 330 and the motor part 200.

In the embodiment shown, since the inverter housing 310 is not necessary, the communication connector 312 and the power connector 314 are positioned at the rear side of the inverter device 330.

In addition, although not illustrated, a rear cover (not shown) of the main housing 110 may be provided at one side of the inverter device 330 opposite to the motor part 200, i.e., at the rear side of the inverter device 330 in the embodiment shown.

The rear cover (not shown) is configured to tightly close the rear side of the main housing 110, which makes it possible to protect the inverter device 330 received therein.

In addition, a communication module (not shown) configured such that the communication connector 312 and the power connector 314 positioned at the rear side of the inverter device 330 can be electrically connected to the outside may be provided at the rear cover (not shown).

In this embodiment, a space for receiving the terminal structure 1000 may be defined between the inverter device 330 and the motor part 200.

As described above, the terminal structure 1000 received in the space can be coupled to the main housing 110 by the terminal structure securing portion 116 provided at the main housing 110.

In this embodiment, as the housing part 100 and the inverter part 300 are incorporated, the overall size of the electric compressor 10 can be reduced.

In addition, the distance between the inverter device 330 and the motor part 200 can be reduced as well. As a result, even when a high current is applied, the terminal structure 1000 can act as a resistance to reduce an amount of heat generated.

(1) Description of Terminal 1100

Figure 5:
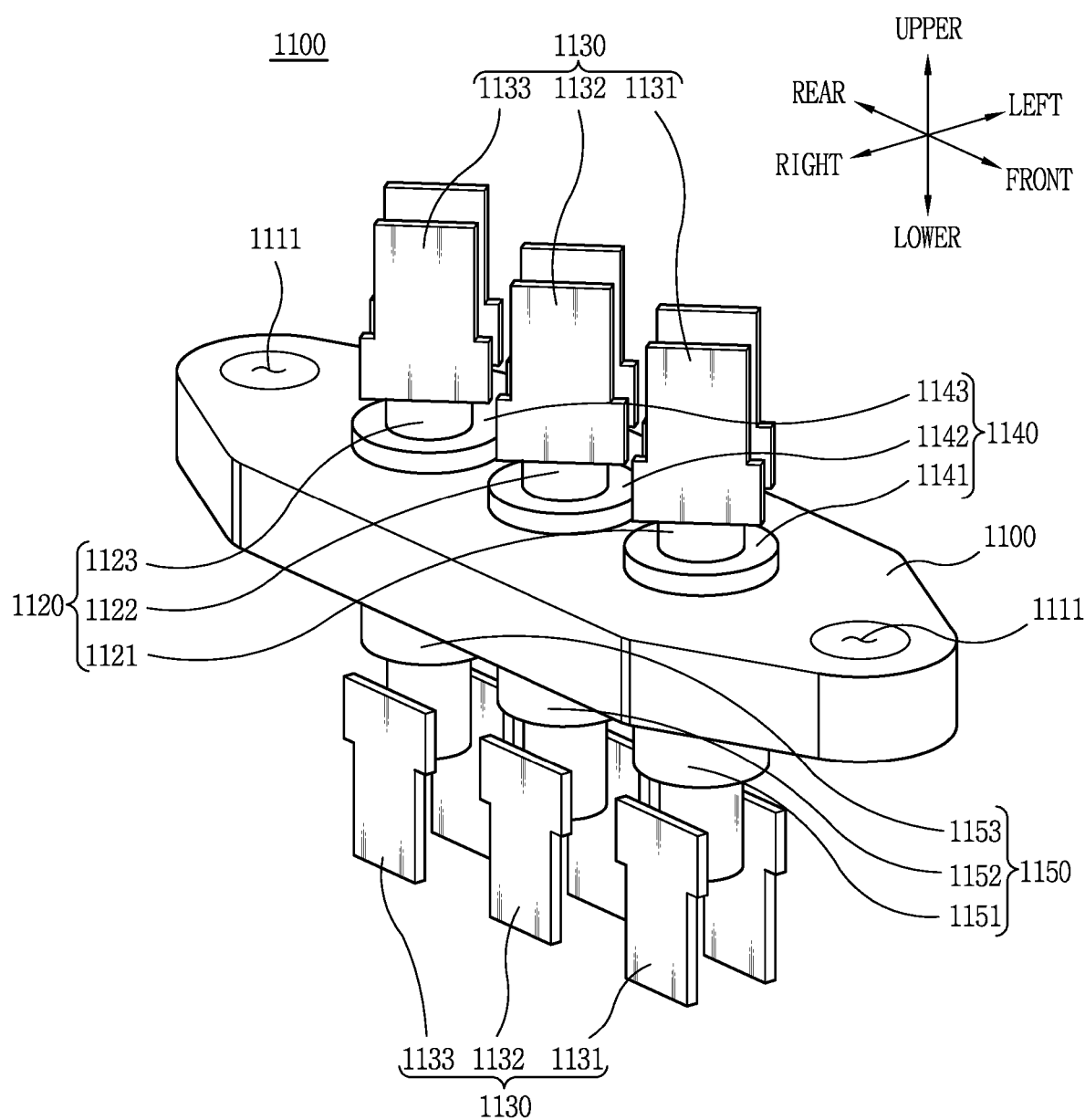
FIG. 5 is a perspective view showing a terminal provided in the terminal structure of FIG. 3.

Hereinafter, the terminal 1100 according to the embodiment of the present invention will be described in detail with reference to FIGS. 5 to 7.

The terminal 1100 receives the control signal and power applied to the inverter device 330 and transfers them to the motor part 200. The terminal 1100 is electrically connected to the motor part 200 and the inverter device 330.

The terminal 1100 is positioned between the inverter device 330 and the motor part 200. As described below, the terminal 1100 is electrically connected to the inverter device 330 via the busbar assembly 1200. In addition, the terminal 1100 is electrically connected to the motor part 200 via a connector module 230.

In the embodiment shown, the terminal 1100 includes a support member 1110, an electric connection member 1120, a contact plate 1130, an insulating member 1140, and a connector coupling portion 1150.

1) Description of Support Member 1110

The support member 1110 forms the body of the terminal 1100. In addition, the support member 1110 supports the electric connection member 1120 for electrically connecting the inverter device 330 and the motor part 200.

In the embodiment shown, although the support member 1110 is symmetrically formed in a solid shape with rounded front and rear sides, it can vary.

A plurality of support holes (not shown) are formed in the support member 1110. The electric connection member 1120 is coupled through each of the plurality of support holes (not shown). The shape of the support hole (not shown) preferably corresponds to the shape of the electric connection member 1120.

Preferably, the support member 1110 is made of a highly rigid and insulating material.

As such, it is possible to prevent the control signal and power applied to the electric connection member 1120 coupled to the support member 1110 in a piercing manner from being transferred to an arbitrary member. At the same time, it is also possible to prevent a noise signal from being applied from the support member 1110 to the electric connection member 1120, which otherwise leads to an incorrect operation of the motor part 200.

The support member 1110 includes a fastening hole 1111.

The fastening hole 1111 allows the support member 1110 to be coupled to the terminal structure securing portion 116 of the main housing 110.

To this end, a separate screw member (not shown) or the like may be provided that is coupled to the fastening hole 1111 in a piercing manner and screwed to the terminal structure securing portion 116.

In the embodiment shown, the fastening hole 1111 is formed in the support member 1110 in a vertical direction, and the fastening holes 1111 are positioned at the front and rear sides of the support member 1110, respectively.

The fastening hole 1111 may have any position and shape so far as it can couple the support member 1110 to the terminal structure securing portion 116.

The respective ends of the electric connection members 1120 coupled to the support member 1110 in a piercing manner project from one side and the opposite side of the support member 1110, i.e., from the upper side and the lower side in the embodiment shown.

In the embodiment shown, the ends of the electric connection members 1120 that project from the upper side of the support member 1110 are connected to the inverter device 330. In addition, the ends of the electric connection members 1120 that project from the lower side of the support member 1110 are connected to the motor part 200.

The directions of the respective ends of the electric connection members 1120 that are connected to the inverter device 330 and the motor part 200 can vary.

In the embodiment shown, a plurality of insulating members 1140 are provided on the top surface of the support member 1110. In addition, a plurality of connector coupling portions 1150 are provided on the bottom surface of the support member 1110.

When the directions of the respective ends of the electric connection members 1120 that are connected to the inverter device 330 and the motor part 200 are changed, it is also preferable to correspondingly change the positions of the insulating members 1140 and the connector coupling portions 1150.

2) Description of Electric Connection Member 1120

The electric connection member 1120 is electrically connected to the inverter device 330 and the motor part 200 to transfer the control signal and power from the inverter device 330 to the motor part 200.

The electric connection member 1120 may be made of a material having high electric conductivity. As an example, the electric connection member 1120 may be made of copper, phosphor bronze, etc.

In addition, the electric connection member 1120 may be plated with a variety of alloys to enhance rigidity. As an example, the electric connection member 1120 may be plated with Fe, Fe—Ni, Tin, etc.

The electric connection member 1120 is coupled to the support member 1110 in a piercing manner. In the embodiment shown, the electric connection member 1120 is coupled through the support hole (not shown) formed in the support member 1110 in a vertical direction.

Alternatively, the electric connection members 1120 may be provided as an electric connection member 1120 on the side of the inverter device 330 positioned at the upper side of the support member 1110 and an electric connection member 1120 on the side of the motor part 200 positioned at the lower side of the support member 1110.

In this case, the electric connection member 1120 on the side of the inverter device 330 and the electric connection member 1120 on the side of the motor part 200 may be brought into contact with each other in the support hole (not shown) of the support member 1110 or may be electrically connected to each other by a separate means (not shown).

The electric connection member 1120 may be rotatably coupled through the support hole (not shown) of the support member 1110. As the electric connection member 1120 rotates, the angle of the contact plate 1130 provided at the electric connection member 1120 can be adjusted. It will be described below in detail.

A plurality of electric connection members 1120 may be provided. In the embodiment shown, three electric connection members 1120 are provided that include a first electric connection member 1121, a second electric connection member 1122, and a third electric connection member 1123. It results from a three phase current to be applied to the inverter device 330 and the motor part 200.

Alternatively, a single electric connection member 1120 may be provided. This embodiment will be contemplated when a current to be applied to the inverter device 330 and the motor part 200 is a single phase current.

In the embodiment shown, the electric connection member 1120 is formed in an elongate cylindrical shape extending in a longitudinal direction, i.e., in a vertical direction.

The electric connection member 1120 may have any shape so far as it can be coupled to the support member 1110 in a piercing manner to electrically connect the inverter device 330 and the motor part 200.

A plurality of contact plates 1130 may be provided at one end of the electric connection member 1120, i.e., at the upper end of the electric connection member 1120 in the embodiment shown.

In addition, a plurality of contact plates 1130 may be provided at the other end opposite to one end of the electric connection member 1120, i.e., at the lower end of the electric connection member 1120 in the embodiment shown.

The respective ends of the electric connection member 1120 and the contact plates 1130 are electrically connected, respectively.

That is, the control signal and power applied to the electric connection member 1120 may be transferred to the electric connection member 1120 through the contact plates 1130. Moreover, the control signal and power applied from the electric connection member 1120 may be transferred to an external device through the contact plates 1130.

A process of transferring the control signal and power from the inverter device 330 to the motor part 200 through the electric connection member 1120 will be described below in detail.

3) Description of Contact Plate 1130

The contact plates 1130 are positioned at both ends of the electric connection member 1120 in a longitudinal direction. The contact plates 1130 are brought into contact with the respective ends of the electric connection member 1120 to increase the surface area of the electric connection member 1120.

In the embodiment shown, the contact plate 1130 is generally formed in a rectangular plate shape, the side facing the support member 1110 being larger than the other side. As such, it is possible to adjust the distance of the contact plate 1130 inserted into the connector module 230 and the busbar assembly 1200.

In the embodiment shown, the outer end of the contact plate 1130, i.e., the end of the contact plate 1130 opposite to the support member 1110 extends further than the end of the electric connection member 1120. As such, the area of the contact plate 1130 increases, as a result of which the area of the electric connection member 1120 can increase.

It is preferable to determine the area of the contact plate 1130 depending on the magnitude of the current to be applied. That is, as the magnitude of the current applied increases, the area of the contact plate 1130 can also increase.

The contact plate 1130 may have any shape so far as the connector module 230 of the motor part 200 and the busbar assembly 1200 can be coupled thereto.

The contact plate 1130 is electrically connected to the electric connection member 1120. To this end, the contact plate 1130 is preferably made of a material having high conductivity.

A plurality of contact plates 1130 may be provided at each end of the electric connection member 1120. In the embodiment shown, two contact plates 1130 are provided at each end of the electric connection member 1120.

More specifically, two first contact plates 1131 are provided at each end of the first electric connection member 1121, two second contact plates 1132 are provided at each end of the second electric connection member 1122, and two third contact plates 1133 are provided at each end of the third electric connection member 1123.

The contact plates 1130 provided at each end of the electric connection member 1120 may be disposed at a certain angle. In the embodiment shown, two contact plates 1130 provided at a specific end of the electric connection member 1120 are disposed at an angle of 180°. That is, the two contact plates 1130 are disposed in parallel to face each other.

The certain angle of the plurality of contact plates 1130 can vary. It is preferably determined in consideration of the connection relationship between the inverter device 330 and the motor part 200.

In addition, the plurality of contact plates 1130 provided at the upper side of the support member 1110 and the plurality of contact plates 1130 provided at the lower side of the support member 1110 may be disposed in parallel or at an angle.

Figure 6:
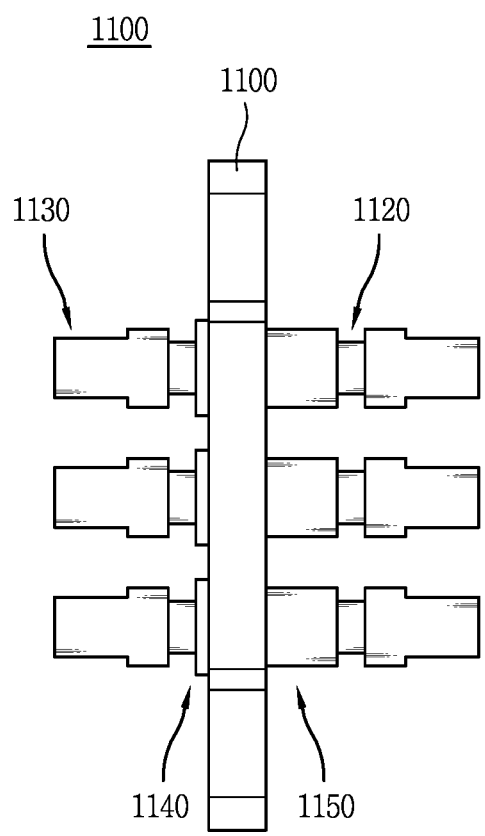
FIGS. 6A and 6B are a side view and a plan view showing the terminal of FIG. 5, respectively.
Figure 6:
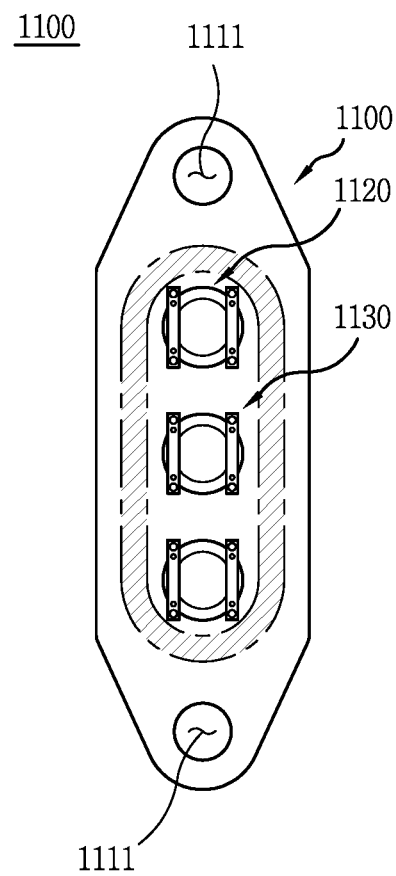
Figure 7:
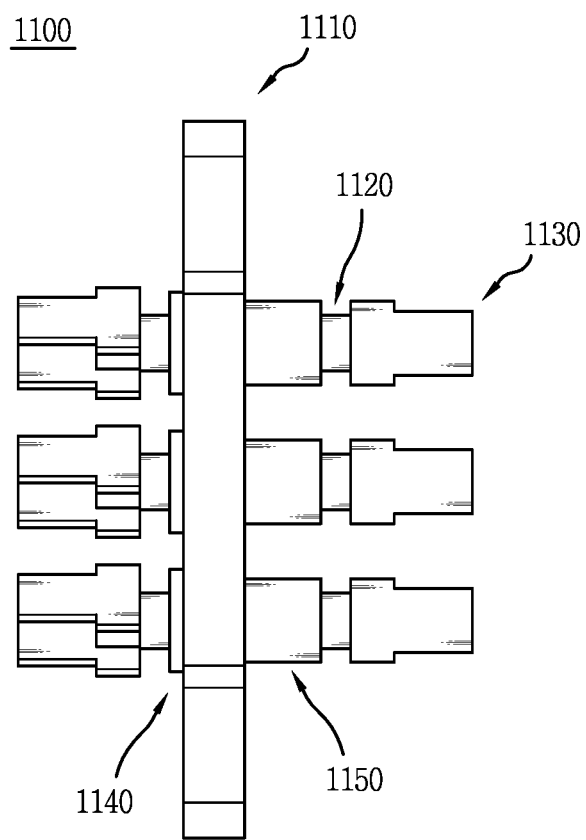
FIG. 7 is a side view showing another example of the terminal of FIG. 6.

That is, in the embodiment shown in FIG. 6, the contact plates 1130 provided at the upper side and the lower side of the support member 1110, respectively, are disposed in parallel. Further, referring to FIG. 7, for example, the contact plates 1130 provided at the upper side of the support member 1110 (e.g., to the left side of FIG. 7) and the contact plates 1130 at the lower side of the support member 1110 (e.g., to the right side of FIG. 7), are disposed at an angle relative to one another.

How to dispose the respective contact plates 1130 described above is preferably determined in consideration of the connection relationship between the inverter device 330 and the motor part 200.

Either the connector module 230 of the motor part 200 or a coupling member 1260 of the busbar assembly 1200 is connected to each contact plate 1130.

In an embodiment, each contact plate 1130 may be inserted into and coupled to the connector module 230 or the coupling member 1260.

4) Description of Insulating Member 1140

The insulating member 1140 serves to prevent unnecessary electric connection between the support member 1110 and the electric connection member 1120. The insulating member 1140 is configured to insulate between the support hole (not shown) and the electric connection member 1120 and one surface of the support member 1110 and the electric connection member 1120.

That is, part of the insulating member 1140 may be positioned between the inner surface of the support hole (not shown) and the electric connection member 1120, inside the support hole (not shown).

In the embodiment shown, the insulating member 1140 is positioned at one side facing the inverter device 330, i.e., at the upper side of the support member 1110. It is because the connector coupling portion 1150 discussed later is provided at the lower side of the support member 1110.

Alternatively, the insulating members 1140 may be provided at both the upper and lower sides of the support member 1110.

The insulating member 1140 is preferably made of a highly insulating material. In an embodiment, the insulating member 1140 may be made of a rubber, synthetic resin, or ceramic, etc.

The number of the insulating members 1140 preferably corresponds to the number of the electric connection members 1120 and the number of the support holes (not shown).

In the embodiment shown, the electric connection members 1120 include a first electric connection member 1121, a second electric connection member 1122, and a third electric connection member 1123. Therefore, the number of the support holes (not shown) formed in the support member 1110 is three.

Accordingly, in the embodiment shown, three insulating members 1140 are also provided that include a first insulating member 1141, a second insulating member 1142, and a third insulating member 1143. They are respectively disposed on the support holes (not shown) into which the respective electric connection members 1120 have been inserted.

5) Description of Connector Coupling Portion 1150

The connector coupling portion 1150 serves to prevent unnecessary electric connection between the support member 1110 and the electric connection member 1120. The connector coupling portion 1150 is configured to insulate between the support hole (not shown) and the electric connection member 1120 and one surface of the support member 1110 and the electric connection member 1120.

That is, part of the connector coupling portion 1150 may be positioned between the inner surface of the support hole (not shown) and the electric connection member 1120, inside the support hole (not shown).

In addition, the connector coupling portion 1150 may act as a factor for identifying the direction of the terminal 1100.

That is, the connector coupling portion 1150 is formed with a height greater than that of the insulating member 1140 (see FIG. 6).

Thus, when the terminal structure 1000 is manufactured and installed on the electric compressor 10, the user can easily distinguish and connect the insulating member 1140 and the connector coupling portion 1150 to the inverter device 330 and the motor part 200, respectively.

The connector coupling portion 1150 is preferably made of a highly insulating material. In an embodiment, the connector coupling portion 1150 may be made of a rubber, synthetic resin, or ceramic, etc.

In the embodiment shown, the connector coupling portion 1150 is positioned at one side facing the motor part 200, i.e., at the lower side of the support member 1110. It is because the insulating member 1140 is provided at the upper side of the support member 1110.

In the embodiment shown, the electric connection members 1120 include a first electric connection member 1121, a second electric connection member 1122, and a third electric connection member 1123. Therefore, the number of the support holes (not shown) formed in the support member 1110 is three.

Accordingly, in the embodiment shown, three connector coupling portions 1150 are also provided that include a first connector coupling portion 1151, a second connector coupling portion 1152, and a third connector coupling portion 1153. They are respectively disposed on the support holes (not shown) into which the respective electric connection members 1120 have been inserted.

(2) Description of Busbar Assembly 1200

Figure 8:
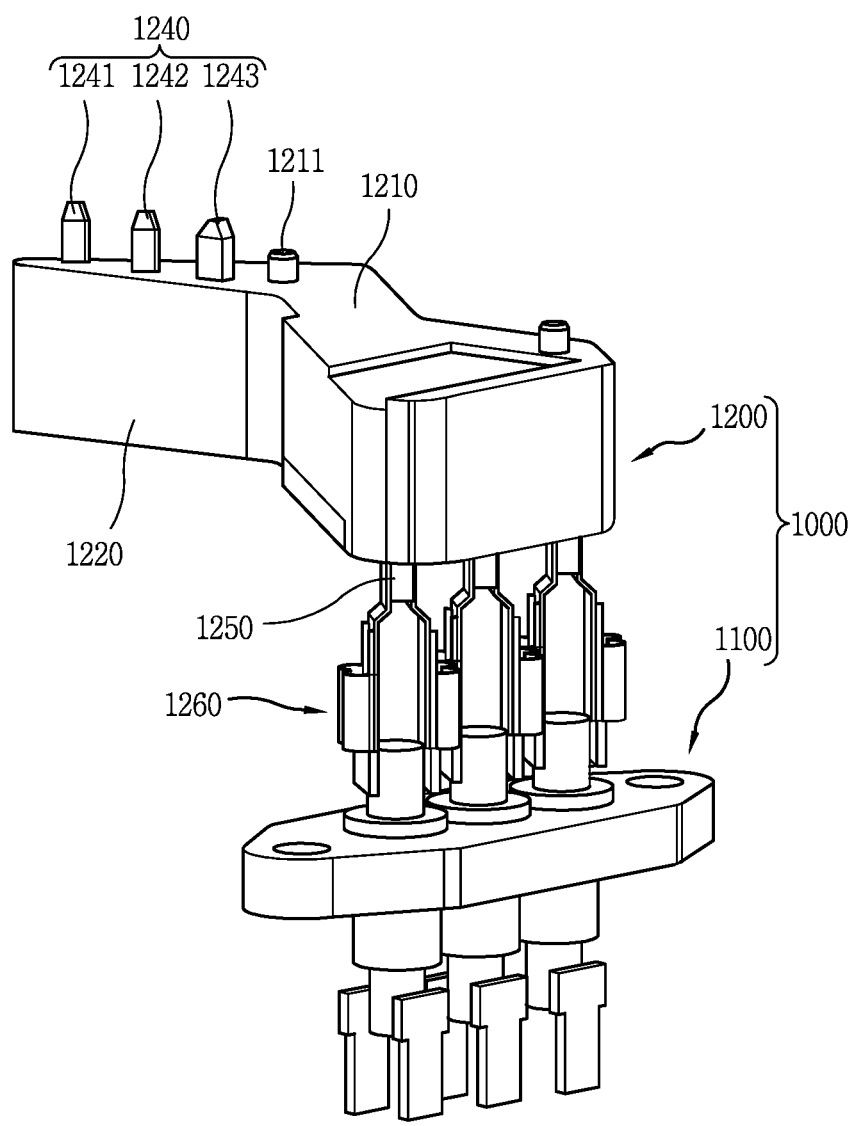
FIG. 8 is a perspective view showing a busbar assembly connected to the terminal of FIG. 5.
Figure 9:
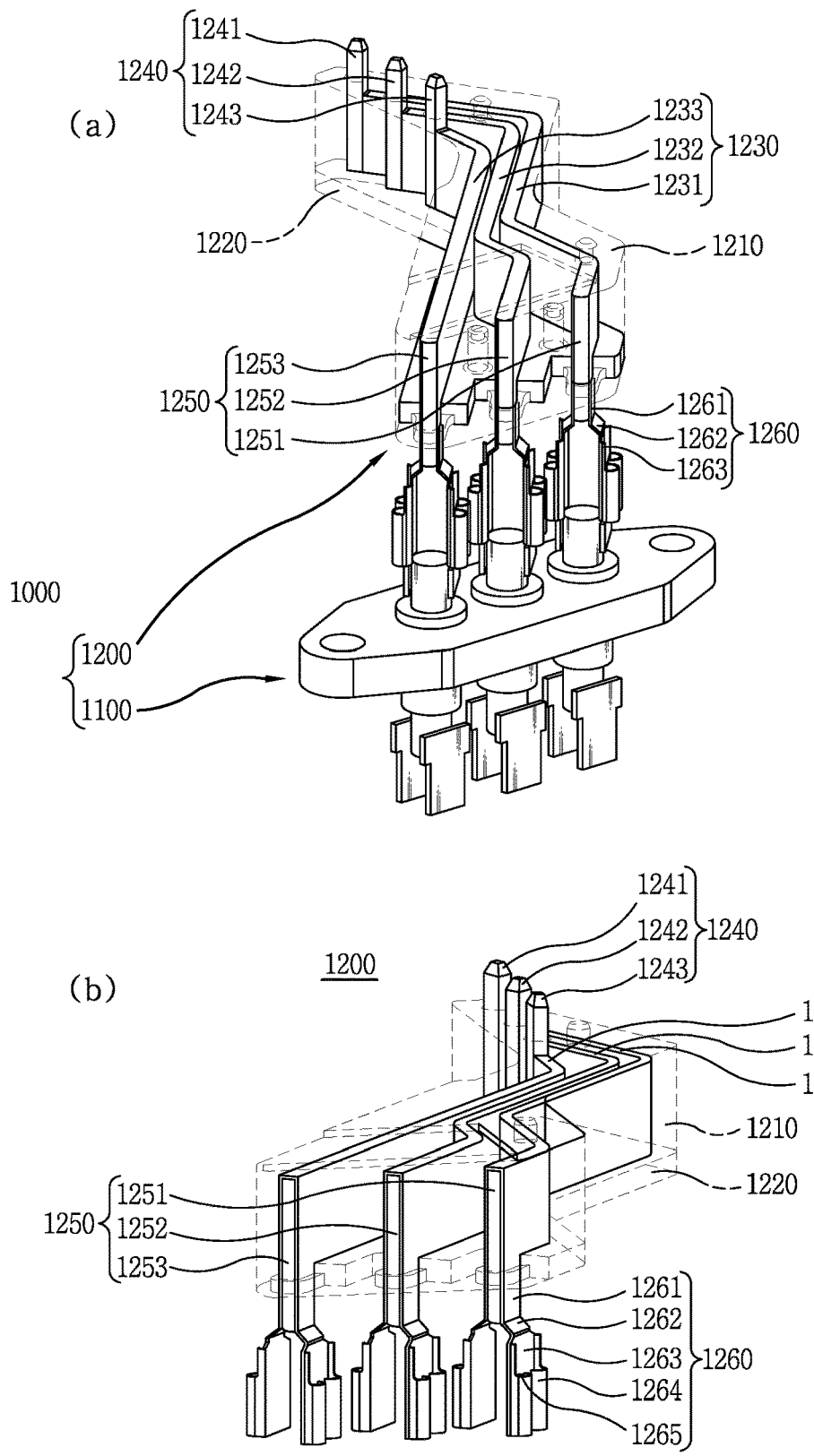
FIG. 9 is a partially transparent perspective view showing the connection of the busbar assembly and the terminal of FIG. 8.
Figure 10:
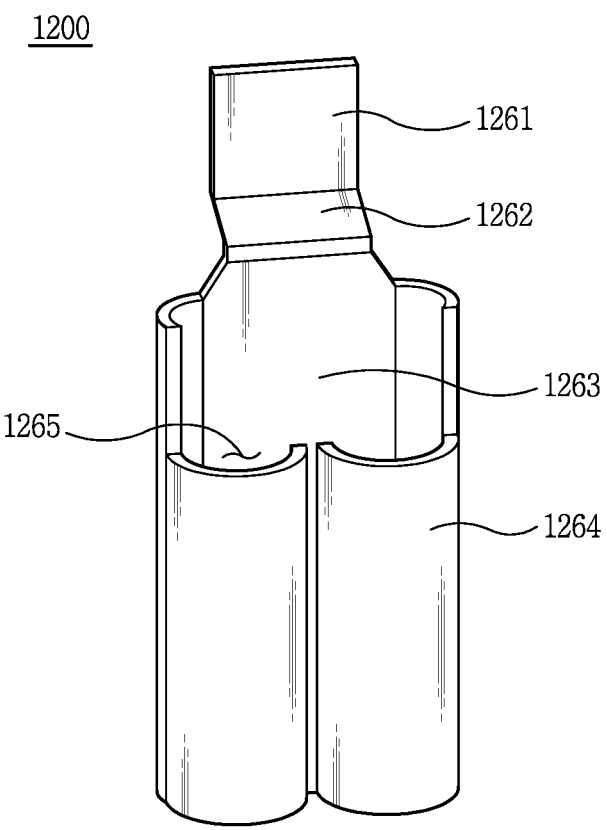
FIG. 10 is a perspective view showing a coupling member provided in the busbar assembly of FIGS. 8 and 9.

Hereinafter, the busbar assembly 1200 according to the embodiment of the present invention will be described in detail with reference to FIGS. 8 to 10.

The busbar assembly 1200 electrically connects the terminal 1100 and the inverter device 330. That is, the control signal and power applied from the inverter device 330 may be transferred to the terminal 1100 through the busbar assembly 1200. The control signal and power transferred to the terminal 1100 are transferred to the motor part 200.

The busbar assembly 1200 is positioned between the terminal 1100 and the inverter device 330. In the embodiment shown, the busbar assembly 1200 is electrically connected to the contact plate 1130 positioned at one side of the terminal 1100 facing the inverter device 330.

In the embodiment shown, the busbar assembly 1200 includes a busbar housing 1210, a busbar base 1220, a busbar 1230, an inverter access portion 1240, an electric connection member access portion 1250, and a coupling member 1260.

1) Description of Busbar Housing 1210

The busbar housing 1210 defines the external appearance of the upper side of the busbar assembly 1200. That is, the busbar housing 1210 is part of the busbar assembly 1200 exposed to the outside.

In order to prevent unnecessary electric connection between the inverter device 330 and the terminal 1100, the busbar housing 1210 is preferably made of a highly insulating material. In an embodiment, the busbar housing 1210 may be made of a rubber or synthetic resin, etc.

A fastening projection 1211 projects from one surface of the busbar housing 1210, i.e., from the top surface in the embodiment shown.

The fastening projection 1211 is inserted into a fastening groove (not shown) formed in the inverter device 330, which allows the busbar assembly 1200 to be stably coupled to the inverter device 330.

In the embodiment shown, two fastening projections 1211 are provided, but the number of the fastening projections 1211 can vary. However, in order to stably couple the busbar assembly 1200, at least two fastening projections 1211 are preferably provided.

The busbar base 1220 is coupled to one side of the busbar housing 1210, i.e., to the lower side of the busbar housing 1210 in the embodiment shown.

A certain space is defined between the busbar housing 1210 and the busbar base 1220. The busbar 1230 is received in the inner space of the busbar housing 1210.

In the embodiment shown, three busbars 1230 are received in the inner space of the busbar housing 1210. It results from a three phase current flowing through the three electric connection members 1120 in the electric compressor 10 according to the embodiment shown.

The number of the busbars 1230 received in the inner space of the busbar housing 1210 can vary. It would be apparent that the number of the busbars 1230 should correspond to the number of the electric connection members 1120.

In the embodiment shown, the busbar housing 1210 is formed in an elongate polygonal column shape extending in the lateral direction. The busbar housing 1210 has any shape so far as it can receive the busbar 1230.

A plurality of through holes (not shown) are formed in one surface of the busbar housing 1210, i.e., in the top surface in the embodiment shown, such that the inverter access portions 1240 can pass through and project from the through holes.

2) Description of Busbar Base 1220

The busbar base 1220 defines the external appearance of the lower side of the busbar assembly 1200. That is, the busbar base 1220 is part of the busbar assembly 1200 exposed to the outside.

In order to prevent unnecessary electric connection between the inverter device 330 and the terminal 1100, the busbar base 1220 is preferably made of a highly insulating material. In an embodiment, the busbar base 1220 may be made of a rubber or synthetic resin, etc.

The busbar housing 1210 is coupled to one side of the busbar base 1220, i.e., to the upper side of the busbar base 1220 in the embodiment shown. As described above, the busbar 1230 is received in a space defined by such coupling.

In the embodiment shown, three busbars 1230 are received in the inner space of the busbar base 1220. It results from a three phase current flowing through the three electric connection members 1120 in the electric compressor 10 according to the embodiment shown.

The number of the busbars 1230 received in the inner space of the busbar base 1220 can vary. It would be apparent that the number of the busbars 1230 should correspond to the number of the electric connection members 1120.

In the embodiment shown, the busbar base 1220 is formed in an elongate polygonal column shape extending in the lateral direction. The busbar base 1220 has any shape so far as it can receive the busbar 1230.

In addition, the shape of the busbar base 1220 is preferably changed to correspond to the shape of the busbar housing 1210.

A plurality of through holes (not shown) are formed in one surface of the busbar housing 1210, i.e., in the bottom surface in the embodiment shown, such that the electric connection member access portions 1250 can pass through and project from the through holes.

3) Description of Busbar 1230

The busbar 1230 electrically connects the inverter device 330 and the terminal 1100. More specifically, the busbar 1230 is electrically connected to the terminal coupling module 334 of the inverter device 330 and the contact plate 1130 of the terminal 1100, respectively.

With the above connection, the control signal and power applied to the inverter device 330 can be transferred to the terminal 1100 through the busbar 1230.

The busbar 1230 may be made of a material having high electric conductivity. As an example, the busbar 1230 may be made of copper, phosphor bronze, etc.

The busbar 1230 is received in the space defined by coupling the busbar housing 1210 and the busbar base 1220. That is, the busbar 1230 is not exposed to the outside of the busbar assembly 1200.

In the embodiment shown, three busbars 1230 are provided that include a first busbar 1231, a second busbar 1232, and a third busbar 1233. It results from a three phase current applied to the electric compressor 10 according to the embodiment shown.

The number of the busbars 1230 may be changed depending on the phase of the current applied.

In the embodiment shown, each busbar 1230 is formed with at least one bent portion. More specifically, the first busbar 1231 and the second busbar 1232 have three bent portions while the third busbar 1233 has one bent portion.

Each busbar 1230 may have any shape so far as the busbar assembly 1200 can electrically connect the inverter device 330 and the terminal 1100.

The busbar 1230 may be received in the space defined by the busbar housing 1210 and the busbar base 1220 and changed to any shape that can electrically connect the inverter device 330 and the terminal 1100.

The electric connection member access portion 1250 projects toward the terminal 1100 at one end of the busbar 1230 that is adjacent to the terminal 1100. The electric connection member access portion 1250 is electrically connected to the terminal 1100 through the coupling member 1260.

The inverter access portion 1240 is provided at one end of the busbar 1230 that faces away from the terminal 1100, i.e., the other end opposite to the one end of the busbar 1230 that is adjacent to the terminal 1100. The inverter access portion 1240 is electrically connected to the terminal coupling module 334 of the inverter device 330.

The first busbar 1231, the second busbar 1232 and the third busbar 1233 are preferably disposed to be spaced apart from one another.

That is, it is preferable that the first busbar 1231, the second busbar 1232 and the third busbar 1233 should be physically and electrically isolated from one another so that currents flowing through the respective busbars 1231, 1232 and 1233 do not affect one another.

4) Description of Inverter Access Portion 1240

The inverter access portion 1240 electrically connects the busbar 1230 and the inverter device 330. That is, in the inverter access portion 1240, the busbar 1230 is electrically connected to the inverter device 330.

The inverter access portion 1240 is preferably made of a material having high electric conductivity.

The inverter access portion 1240 projects from the end of the busbar 1230, that is opposite to the terminal 1100, to one side, i.e., to the upper side of the busbar 1230 in the embodiment shown.

Also in the embodiment shown, the inverter access portion 1240 is formed in a cylindrical shape with a certain diameter, but chamfered with the diameter decreased toward the upper side. With this shape, the inverter access portion 1240 can be easily inserted into and coupled to the terminal coupling module 334.

The inverter access portion 1240 may have any position and shape so far as it can be electrically connected to the terminal coupling module 334 of the inverter device 330.

The inverter access portion 1240 is coupled to the busbar housing 1210 in a piercing manner. That is, the inverter access portion 1240 passes through the through hole (not shown) formed in the busbar housing 1210, such that one end of the inverter access portion 1240 is positioned at the upper side of the busbar housing 1210.

In the embodiment shown, three busbars 1230 are provided. Accordingly, three inverter access portions 1240 are also provided that include a first inverter access portion 1241, a second inverter access portion 1242, and a third inverter access portion 1243.

The respective inverter access portions 1241, 1242 and 1243 are provided at the ends of the respective busbars 1231, 1232 and 1233.

As described above, the terminal coupling module 334 may be formed as a groove. The inverter access portions 1240 may be inserted into the terminal coupling modules 334, respectively, to be electrically connected thereto.

In this case, the terminal coupling modules 334 may also be formed as three grooves electrically isolated from one another.

5) Description of Electric Connection Member Access Portion 1250

The electric connection member access portion 1250 electrically connects the busbar 1230 and the terminal 1100. That is, in the electric connection member access portion 1250, the busbar 1230 is electrically connected to the electric connection member 1120.

The electric connection member access portion 1250 is preferably made of a material having high electric conductivity.

The electric connection member access portion 1250 projects from the end of the busbar 1230, that is adjacent to the terminal 1100, to one side, i.e., to the lower side of the busbar 1230 in the embodiment shown.

Also in the embodiment shown, the electric connection member access portion 1250 is formed in a polyhedral shape extending in a longitudinal direction, with the same width as the thickness of the busbar 1230.

The electric connection member access portion 1250 may have any position and shape so far as it can be electrically connected to a busbar coupling portion 1261 of the coupling member 1260.

The electric connection member access portion 1250 is coupled to the busbar base 1220 in a piercing manner. That is, the electric connection member access portion 1250 passes through the through hole (not shown) formed in the busbar base 1220, such that one end of the electric connection member access portion 1250 is positioned at the lower side of the busbar base 1220.

In the embodiment shown, three busbars 1230 are provided. Accordingly, three electric connection member access portions 1250 are also provided that include a first electric connection member access portion 1251, a second electric connection member access portion 1252, and a third electric connection member access portion 1253.

The respective electric connection member access portions 1251, 1252 and 1253 are provided at the ends of the respective busbars 1231, 1232 and 1233.

In addition, the length by which the respective electric connection member access portions 1251, 1252 and 1253 project from the busbar base 1220 to the lower side is preferably determined to be long enough to allow the busbar coupling portions 1261 of the coupling members 1260 to be stably coupled thereto.

6) Description of Coupling Member 1260

The coupling member 1260 electrically connects the busbar 1230 and the terminal 1100. More specifically, the coupling member 1260 electrically connects the electric connection member access portion 1250 of the busbar 1230 and the contact plate 1130 of the terminal 1100.

The coupling member 1260 is preferably made of a material having high electric conductivity.

The coupling member 1260 may be provided at each contact plate 1130.

In the embodiment shown, two contact plates 1130 are provided at every upper end of each electric connection member 1120. The coupling member 1260 may be provided at each contact plate 1130, so the number of the coupling members 1260 becomes six.

The number of the coupling members 1260 can vary. As an example, the coupling member 1260 may be electrically connected to only any one of the contact plates 1130 provided at each end of the electric connection member 1120.

The number of the coupling members 1260 can be determined depending on the magnitude of the current to be applied to the electric compressor 10.

The coupling member 1260 includes a busbar coupling portion 1261, a neck portion 1262, a contact plate support portion 1263, a contact plate securing portion 1264, and a contact plate space portion 1265.

The busbar coupling portion 1261 is provided at the uppermost side of the coupling member 1260 to extend in a vertical direction. The busbar coupling portion 1261 is electrically connected to the electric connection member access portion 1250 of the busbar 1230.

In the embodiment shown, the busbar coupling portion 1261 is formed in a quadrangular plate shape, but may be changed to any shape that can be electrically connected to the electric connection member access portion 1250.

The busbar coupling portion 1261 can be connected to the electric connection member access portion 1250 in a shape that can ensure stable coupling to the electric connection member access portion 1250.

In an embodiment, the busbar coupling portion 1261 may be slid and inserted into an insertion groove (not shown) formed in the electric connection member access portion 1250. In this case, the size and shape of the insertion groove (not shown) are preferably determined to correspond to the size and shape of the busbar coupling portion 1261.

The neck portion 1262 is provided at one end of the busbar coupling portion 1261, i.e., at the lower end in the embodiment shown.

The neck portion 1262 serves to adjust the distance between the busbar assembly 1200 and the terminal 1100. The neck portion 1262 extends to the lower side at a certain angle to the busbar coupling portion 1261.

That is, if the distance between the busbar assembly 1200 and the terminal 1100 is too large, it is possible to decrease the vertical length of the neck portion 1262 by decreasing the angle between the neck portion 1262 and the busbar coupling portion 1261.

Meanwhile, if the distance between the busbar assembly 1200 and the terminal 1100 is too small, it is possible to increase the vertical length of the neck portion 1262 by increasing the angle between the neck portion 1262 and the busbar coupling portion 1261.

The neck portion 1262 may be adjusted to allow the contact plate 1130 to be smoothly inserted into the contact plate space portion 1265. That is, it is possible to adjust the front side, rear side, left side and right side positions of the contact plate space portion 1265 to match with the position of the contact plate 1130, by adjusting the neck portion 1262.

In addition, the contact plate support portion 1263, the contact plate securing portion 1264 and the contact plate space portion 1265 of the coupling member 1260 that are positioned adjacent to one another may be spaced apart from one another by the neck portion 1262 by a certain distance.

The contact plate support portion 1263 is provided at one end of the neck portion 1262, i.e., at the lower end of the neck portion 1262.

The contact plate support portion 1263 is brought into contact with one plane surface of the contact plate 1130. The contact plate support portion 1263 extends to the lower side at a certain angle to the neck portion 1262. In the embodiment shown, the contact plate support portion 1263 extends in a vertical direction to be in parallel with the busbar coupling portion 1261.

In the embodiment shown, when the surfaces of the respective contact plates 1130 provided at any one end of the electric connection member 1120, that face each other, are referred to as first surfaces and the other surfaces are referred to as second surfaces, the contact plate support portion 1263 is brought into contact with the first surface of each contact plate 1130.

As described below, the contact plate securing portions 1264 that project from both sides of the contact plate support portion 1263 are bought into contact with the second surface.

Alternatively, the contact plate support portion 1263 may be configured to contact the second surface of each contact plate 1130 and the contact plate securing portions 1264 may be configured to contact the first surface of each contact plate 1130.

The contact plate securing portions 1264 extend from both ends of the contact plate support portion 1263. In addition, the contact plate securing portions 1264 are configured to contact one surface of the contact plate 1130 that the contact plate support portion 1263 does not contact.

In the embodiment shown, the contact plate support portion 1263 is brought into contact with the first surface of the contact plate 1130. The contact plate securing portions 1264 extend from both sides of the contact plate support portion 1263, surrounding the contact plate 1130.

The contact plate securing portion 1264 includes a first extension extended from the contact plate support portion 1263 by a certain distance at an angle to the contact plate support portion 1263 and a second extension extended in a curved manner from the end of the first extension toward the second surface of the contact plate 1130.

The end of the second extension is brought into contact with the contact plate 1130, such that the coupling member 1260 can be stably coupled to the contact plate 1130.

The contact plate space portion 1265 is defined between the contact plate support portion 1263 and the contact plate securing portions 1264. The contact plate 1130 may be inserted into the contact plate space portion 1265, and then secured by the contact plate support portion 1263 and the contact plate securing portions 1264.

4. Description of Connection Relationship Between Terminal Structure 1000 and Electric Compressor 10 According to the Embodiment of the Present Invention The terminal structure 1000 according to the embodiment of the present invention includes the busbar assembly 1200 which can facilitate the connection between the terminal 1100 and the inverter device 330. In addition, the terminal 1100 and the motor part 200 can be easily connected to each other by the connector module 230 of the motor part 200.

Hereinafter, the connection relationship between the terminal structure 1000 and the electric compressor 10 according to the embodiment of the present invention will be described with reference to FIGS. 11 and 12.

The order of the coupling processes of the respective configurations discussed later can vary. The following description will be made in the order of A, B and C for convenience.

Figure 11:
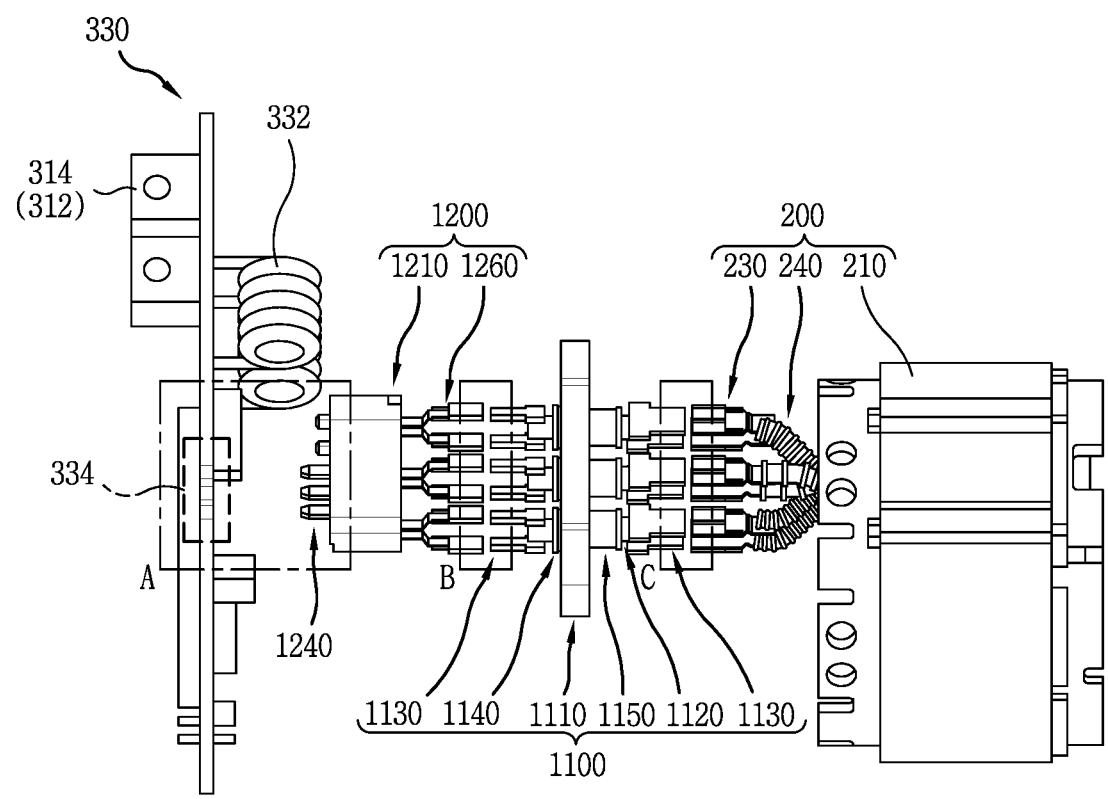
FIG. 11 is a side view showing a process of connecting the terminal structure of FIG. 3 to the electric compressor.
Figure 12:
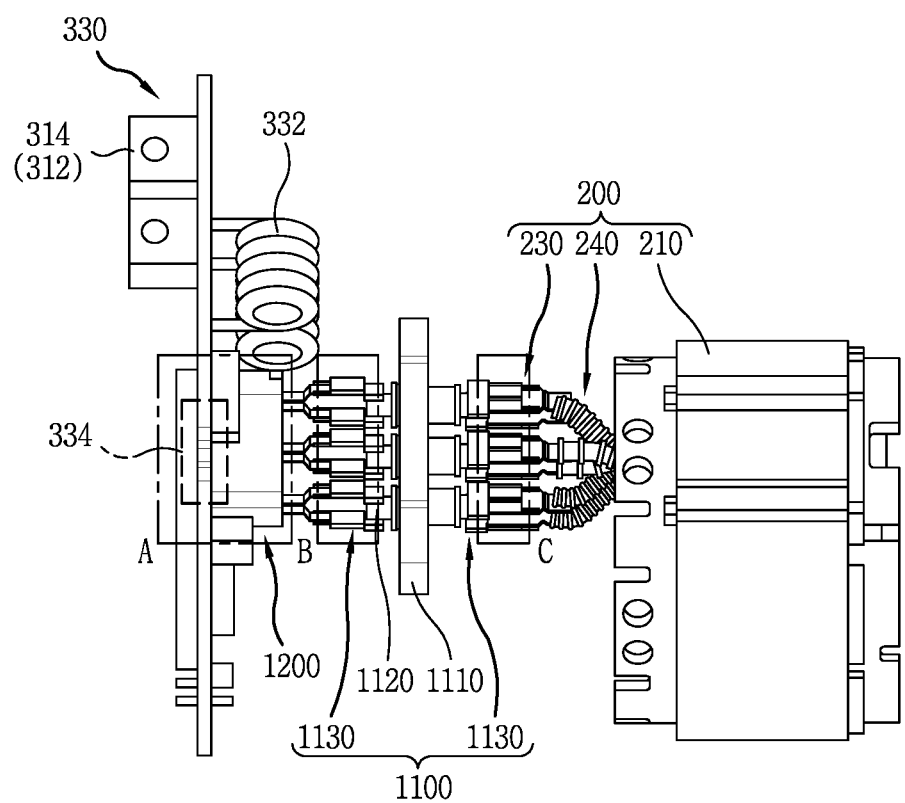
FIG. 12 is a perspective view showing the terminal structure of FIG. 3 connected to the electric compressor.

First, the busbar assembly 1200 is coupled to the terminal 1100 (A in FIGS. 11 and 12).

More specifically, the coupling members 1260 provided at each of the plurality of busbars 1230 are electrically connected to the contact plates 1130 of the terminal 1100, respectively. Here, as described above, the contact plates 1130 brought into contact with the electric connection member access portions 1250 are the contact plates 1130 of the terminal 1100 that are adjacent to the inverter device 330.

The respective contact plates 1130 are inserted into and coupled to the contact plate space portions 1265 formed in the respective coupling members 1260, respectively. Then, the respective contact plates 1130 can be stably coupled by the contact plate support portion 1263 and the contact plate securing portions 1264.

In addition, after the coupling of the busbar assembly 1200 and the terminal 1100 has been achieved, the respective contact plates 1130 and the respective coupling members 1260 may be coupled to each other by welding. It is thus possible to firmly maintain the coupling of the busbar assembly 1200 and the terminal 1100.

With this process, the busbar assembly 1200 and the terminal 1100 are coupled to obtain the terminal structure 1000.

Next, the busbar assembly 1200 and the inverter device 330 are coupled to each other (B in FIGS. 11 and 12).

More specifically, the inverter access portions 1240 provided at each of the plurality of busbars 1230 of the busbar assembly 1200 are electrically connected to the terminal coupling modules 334 of the inverter device 330, respectively.

Each inverter access portion 1240 may be inserted into and coupled to the terminal coupling module 334. To this end, as discussed earlier, the terminal coupling module 334 may be formed as an insertion groove (not shown).

With this process, the inverter device 330 and the terminal structure 1000 are coupled to each other.

Next, the terminal 1100 and the motor part 200 are coupled to each other (C in FIGS. 11 and 12).

More specifically, the contact plates 1130 of the terminal 1100 and the connector modules 230 of the motor part 200 are electrically connected to each other, respectively. Here, as described above, the contact plates 1130 connected to the connector modules 230 are the contact plates 1130 of the terminal 1100 that are adjacent to the motor part 200.

The respective contact plates 1130 are inserted into and coupled to the respective connectors provided at the connector modules 230, respectively.

With this process, the motor part 200 and the terminal structure 1000 are coupled to each other.

The above configurations are electrically connected to one another. That is, the inverter device 330, the busbar assembly 1200, the terminal 1100 and the motor part 200 are electrically connected to one another.

In addition, the inverter device 330 is electrically connected to the outside through the communication connector 312 and the power connector 314.

Accordingly, the control signal and power applied to the inverter device 330 may be transferred to the motor part 200 through the configuration described above. The motor part 200 operates according to the control signal and power, thus compressing the refrigerant.

Here, the inverter device 330 and the terminal 1100 are electrically connected by the busbar assembly 1200 including the busbar 1230 having a large surface area.

Further, the electric connection member 1120 of the terminal 1100 is provided with the contact plate 1130 having a large surface area. The busbar assembly 1200 is electrically connected to the terminal 1100 by the contact plate 1130.

Furthermore, the motor part 200 is electrically connected to the terminal 1100 through the connector module 230, but electrically connected to the contact plate 1130 having a large surface area.

As a result, the area of contact between the respective configurations through which a current flows increases, which makes it possible to reduce heat generation even when a high current is applied to the electric compressor 10.

5. Description of Effects of Electric Compressor 10 Including Terminal Structure 1000 According to the Embodiment of the Present Invention The contact plate 1130 is provided at each end of the respective electric connection members 1120 of the terminal 1100. The contact plate 1130 is electrically connected to the electric connection member 1120 and configured to have a large surface area.

Therefore, the area of contact in which the terminal 1100 and the busbar assembly 1200 and the motor part 200 are electrically connected to one another increases, which makes it possible to reduce heat generation even when a high current is applied, which leads to stable electric connection.

In addition, the plurality of contact plates 1130 may be provided at each end of the respective electric connection members 1120. It is thus possible to maximize the effect of increasing the surface area of the electric connection member 1120.

As compared with a case where a current is directly applied to the electric connection member 1120, the area of contact for electric connection increases, which makes it possible to reduce heat generation even when a high current is applied, which leads to stable electric connection.

Further, there is an effect of increasing the surface area of the electric connection member 1120 merely by providing the contact plate 1130 at each end of the electric connection member 1120. Accordingly, it is possible to increase the surface area of the portion to which a current is applied without increasing the surface area of the electric connection member 1120 itself.

It is thus not necessary to increase the size of the terminal 1100 to apply a high current, as a result of which it is possible to stably apply a high current without increasing the size of the electric compressor 10.

In addition, the plurality of electric connection members 1120 may be provided at the terminal 1100. Currents having different phases can be applied to the respective electric connection members 1120. Moreover, the busbars 1230 electrically connected to the respective electric connection members 1120 are configured to be electrically isolated from one another.

Therefore, not only when a single phase current is applied to the electric compressor 10 but also when a multi-phase current, for example, a three phase current is applied to the electric compressor 10, currents flow through separate current paths, such that the electric compressor 10 can stably operate. Furthermore, a current dispersion effect can be expected as a current flows through a few electric connection members 1120, which makes it possible for the electric compressor 10 to stably operate even when a high current is applied.

The number of the busbars 1230 provided in the busbar assembly 1200 corresponds to the number of the electric connection members 1120. In addition, the respective busbars 1230 are configured to be physically and electrically isolated from one another and received in the space defined by the busbar housing 1210 and the busbar base 1220.

Therefore, complicated wiring is not required for electric connection between the terminal 1100 and the inverter device 330. Further, it is possible to simplify the structure, as compared with a case where a current of each phase is transferred through each wiring, which leads to easy manufacturing, maintenance and repair.

Furthermore, the busbar assembly 1200 is connected to the plurality of electric connection members 1120 through the plurality of busbars 1230 received in the busbar housing 1210. Still furthermore, the inverter device 330, the terminal structure 1000 and the motor part 200 are electrically connected by insertion coupling or connector fastening.

Therefore, complicated wiring is not required even when a plurality of current paths are required to apply three phase power, etc., which makes it possible to simplify the wiring structure for electric connection.

In addition, the inverter device 330 and the busbar assembly 1200 are electrically connected as the inverter access portion 1240 is inserted into and coupled to the terminal coupling module 334. The terminal 1100 and the motor part 200 are electrically connected as the contact plate 1130 is inserted into and coupled to the connector module 230.

Accordingly, complicated wiring is not required to electrically connect the inverter device 330, the terminal structure 1000 and the motor part 200. Further, the inverter device 330, the terminal structure 1000 and the motor part 200 are coupled by inserting any one member into another member, which leads to easy manufacturing, maintenance and repair.

Furthermore, the angle of the plurality of contact plates 1130 electrically connected to each end of the respective electric connection members 1120 can vary.

Accordingly, when the position or angle of the inverter device 330 and the motor part 200 is changed, the angle of the plurality of contact plates 1130 to each end of the electric connection members 1120 may be changed. It is thus possible to electrically connect the inverter device 330 and the motor part 200 without changing the design of the whole electric compressor 10.

Although the preferred embodiments of the present invention have been described above, it would be understood by those skilled in the art that various modifications and variations can be made without departing from the spirit and scope of the present invention as recited in the attached claims.

What is claimed is:

1. A terminal structure, comprising:
   a plate-shaped support member;
   an electric connection member extending in a longitudinal direction through the support member, the electrical connection member being coupled to the support member and electrically connected to a motor part and an inverter device; and
   a plurality of first contact plates positioned at a first end of the electric connection member and a plurality of second contact plates positioned at a second end of the connection member opposite to the first end, the first and second contact plates being electrically connected to the electric connection member,
   wherein the first contact plates are disposed at an angle relative to the second contact plates.

2. The terminal structure of claim 1, wherein the electric connection member is one of a plurality of electric connection members provided in the support member, and the first contact plates are positioned at first ends of the electric connection members and the second contact plates are positioned at second ends of the electric connection members, the second ends being disposed opposite the first ends.

3. The terminal structure of claim 1, wherein the first contact plates are parallel to each other, and the second contact plates are parallel to each other.

4. The terminal structure of claim 1, wherein the first contact plates include two contact plates, and the second contact plates include two contact plates.

5. The terminal structure of claim 1, wherein the support member is made of an electrically insulating material.

6. The terminal structure of claim 1, wherein the electric connection member includes a rounded side and at least one of the first contact plates and the second contact plates is configured to contact the rounded side of the electric connection member.

7. The terminal structure of claim 6, wherein the first contact plates face each other.

8. The terminal structure of claim 1, wherein the electric connection member includes a flat side and at least one of the first contact plates and the second contact plates is configured to contact the flat side of the electric connection member.

9. The terminal structure of claim 8, wherein the first contact plates face each other.

10. The terminal structure of claim 1, further comprising a busbar assembly coupled to the first contact plates,
    wherein the busbar assembly comprises:
    a busbar electrically connected to the first contact plates; and
    a busbar housing configured to receive the busbar.

11. The terminal structure of claim 10, wherein the busbar assembly comprises:
    an electric connection member access portion projecting from one end of the busbar toward the first contact plates; and
    a coupling member for electrically connecting the electric connection member access portion and at least one of the first contact plates.

12. The terminal structure of claim 11, wherein the angle is a first angle and the coupling member comprises:
    a busbar coupling portion electrically connected to the electric connection member access portion;

a neck portion extending from the busbar coupling portion toward the at least one of the first contact plates at a second angle relative to the busbar coupling portion; and a contact plate support portion extending from the neck portion toward the at least one of the first contact plates at a third angle relative to the neck portion and configured to contact one surface of a first contact plate from the first contact plates.

13. The terminal structure of claim 12, wherein the coupling member is one of a plurality of coupling members coupled to the first contact plates, and each of the plurality of coupling members comprises:

a contact plate securing portion extending from the contact plate support portion toward the first contact plate; and a contact plate space portion defined between the contact plate support portion and the contact plate securing portion to receive the first contact plate.

14. An electric compressor, comprising:

a motor part;

an inverter device configured to apply a control signal to the motor part; and a terminal structure positioned between the motor part and the inverter device to electrically connect the motor part and the inverter device, wherein the terminal structure comprises:

a plate-shaped support member;

an electric connection member extending in a longitudinal direction through the support member, the electric connection member being coupled to the support member, and having a first end electrically connected to the motor part and a second end opposite to the first end electrically connected to the inverter device; and a plurality of first contact plates positioned at the first end of the electric connection member and a plurality of second contact plates positioned at the second end, the first contact plates and the second contact plates being electrically connected to the electric connection member, wherein the first contact plates are disposed at an angle relative to the second contact plates.

15. The electric compressor of claim 14, wherein the first contact plates are positioned at a side of the first end of the electric connection member and the second contact plates are positioned at a side of the second end of the electric connection member.

16. The electric compressor of claim 14, wherein the terminal structure comprises:

a busbar assembly coupled to the second contact plates, wherein the busbar assembly comprises:

a busbar extending in a longitudinal direction and electrically connected to the second contact plates; and a busbar housing for receiving the busbar.

17. The electric compressor of claim 16, wherein the angle is a first angle and the second end of the electric connection member extends in a direction toward the inverter device and the busbar assembly extends at a second angle relative to the second end of the electric connection member.

18. The electric compressor of claim 16, wherein the busbar assembly comprises:

an electric connection member access portion positioned at one end of the busbar to project toward the second contact plates; and an inverter access portion positioned at an opposite end of the busbar to project toward the inverter device.

19. The electric compressor of claim 18, wherein the busbar assembly comprises a coupling member for electrically connecting the electric connection member access portion and a second contact plate from the second contact plates, wherein the coupling member comprises:

a busbar coupling portion electrically connected to the electric connection member access portion;

a neck portion extending from the busbar coupling portion toward the second contact plate at a third angle relative to the busbar coupling portion; and a contact plate support portion extending from the neck portion toward the second contact plate at a fourth angle relative to the neck portion and configured to contact one surface of the at least one of the first contact plates.

20. The electric compressor of claim 19, wherein the inverter device comprises a terminal coupling module electrically connected to the inverter access portion of the busbar assembly and the motor part comprises a connector module electrically connected to the first end of the electric connection member.

* * * * *